United States Patent
Ludlow et al.

(10) Patent No.: US 9,674,720 B2
(45) Date of Patent: Jun. 6, 2017

(54) WIRELESS COMMUNICATION LINK DEBUGGING

(71) Applicant: Crestron Electronics, Inc., Rockleigh, NJ (US)

(72) Inventors: Jeffrey Ludlow, Woodcliff Lake, NJ (US); Alina Geormaneanu, River Edge, NJ (US)

(73) Assignee: CRESTON ELECTRONICS, INC., Rockleigh, NJ (US)

( * ) Notice: Subject to any disclaimer, the term of this patent is extended or adjusted under 35 U.S.C. 154(b) by 73 days.

(21) Appl. No.: 14/801,217

(22) Filed: Jul. 16, 2015

(65) Prior Publication Data

US 2016/0044522 A1 Feb. 11, 2016

Related U.S. Application Data

(60) Provisional application No. 62/025,469, filed on Jul. 16, 2014, provisional application No. 62/043,495, filed on Aug. 29, 2014.

(51) Int. Cl.
| | |
|---|---|
| *H04W 72/04* | (2009.01) |
| *H04W 24/08* | (2009.01) |
| *H04L 12/24* | (2006.01) |
| *H04L 12/26* | (2006.01) |

(52) U.S. Cl.
CPC ......... *H04W 24/08* (2013.01); *H04L 41/5025* (2013.01); *H04L 43/0811* (2013.01); *H04L 43/16* (2013.01)

(58) Field of Classification Search
CPC ......... H04L 41/00; H04W 24/08; Y02B 60/50
See application file for complete search history.

(56) References Cited

U.S. PATENT DOCUMENTS

| | | | |
|---|---|---|---|
| 2005/0159166 A1* | 7/2005 | Jonsson | H04W 28/24 455/452.2 |
| 2006/0039346 A1* | 2/2006 | Shapiro | H04L 47/10 370/349 |
| 2007/0086349 A1* | 4/2007 | Liu | H04L 41/5038 370/241 |
| 2008/0200195 A1* | 8/2008 | Abe | H04W 16/14 455/501 |

(Continued)

*Primary Examiner* — Mohamed Kamara
(74) *Attorney, Agent, or Firm* — Creston Electronics, Inc.

(57) ABSTRACT

Provided herein is a system and method for determining the status of one or more wireless communication links in a network such as a personal area network. One or more nodes within the PAN substantially continuously monitor a plurality of quality of service (QoS) communication indicators and generate a first application link quality indicator (ALQI) based on a first subset of the plurality of QoS communication indicators according to a first time period. The node can then modify the first ALQI with a second subset of the plurality of QoS communication indicators only when a first predetermined threshold number of occurrences of the second subset of the plurality of QoS communication indicators has occurred without regard to the first time period to form a first modified ALQI. The node can then report the modified ALQI to a coordinator node that can then act upon the modified ALQI to possibly correct one or more communication link problems to which the reported ALQI pertains to.

14 Claims, 8 Drawing Sheets

(56) References Cited

U.S. PATENT DOCUMENTS

| | | | |
|---|---|---|---|
| 2011/0164527 A1* | 7/2011 | Mishra | H04L 45/123 370/252 |
| 2014/0105046 A1* | 4/2014 | Tellado | H04W 24/08 370/252 |
| 2015/0055471 A1* | 2/2015 | Hellhake | H04L 47/2458 370/235 |

* cited by examiner

FIG. 7A — 700a

| | | Value Range: | 0-7 | | 0-255 | -100-0 |
|---|---|---|---|---|---|---|
| 1 | 2 | 3 | 4 | 5 | 6 | 7 |
| ID | NODE | ALQI | ZLQI | COST | TBMT | RSSI |
| 12 | D47F | 0 | 0 | 0 | 0 | 0 |
| 13 | 447E | 0 | 0 | 0 | 0 | -14 |
| 20 | 6C80 | 255 | 1 | 1 | 147 | 0 |
| 21 | A957 | 0 | 1 | 1 | 0 | 0 |
| 60 | F53C | 0 | 0 | 0 | 0 | 0 |
| 61 | 10A7 | 0 | 0 | 0 | 0 | 0 |

FIG. 7B — 700b

| Value Range: | 0-100% | 0-100% | 0-100% | 0-100% | 0-100% | 0-100% | 0-100% | 0-100% |
|---|---|---|---|---|---|---|---|---|
| 1 | 8 | 9 | 10 | 11 | 12 | 13 | 14 | 15 |
| ID | MACFR | MACRR | APSFR | APSRR | RXCORR | BUSY | NTRNVR | BFENH |
| 12 | 0.00% | 0.00% | 0.00% | 0.00% | 0.00% | 0.00% | 0.00% | 0.00% |
| 13 | 0.00% | 0.00% | 0.00% | 0.00% | 0.00% | 0.00% | 0.00% | 0.00% |
| 20 | 2.33% | 0.00% | 0.00% | 0.00% | 0.00% | 29.99% | 10.57% | 0.00% |
| 21 | 0.00% | 78.98% | 0.05% | 6.23% | 0.00% | 53.83% | 0.01% | 12.5% |
| 60 | 0.00% | 0.00% | 0.00% | 0.00% | 0.00% | 0.00% | 0.00% | 0.00% |
| 61 | 0.00% | 0.00% | 0.00% | 0.00% | 0.00% | 0.00% | 0.00% | 0.00% |

FIG. 7C — 700c

| Value Range: | 0-64 | 0-48 | 0-64 | 0-32 | 0-32 | 0-16 | 0-16 | 0-16 |
|---|---|---|---|---|---|---|---|---|
| 1 | 16 | 17 | 18 | 19 | 20 | 21 | 22 | 23 |
| ID | APF | CCA | APR | MCF | MCR | RXC | NTT | NTT |
| 12 | 0 | 0 | 0 | 0 | 0 | 0 | 0 | 0 |
| 13 | 0 | 16 | 0 | 0 | 0 | 0 | 0 | 0 |
| 20 | 0 | 0 | 22 | 47 | 0 | 32 | 15 | 12 |
| 21 | 0 | 0 | 0 | 0 | 0 | 0 | 0 | 0 |
| 60 | 0 | 0 | 0 | 0 | 0 | 0 | 0 | 0 |
| 61 | 0 | 0 | 0 | 0 | 0 | 0 | 0 | 0 |

WIRELESS COMMUNICATION LINK DEBUGGING

PRIORITY INFORMATION

The present application claims priority under 35 U.S.C. §119(e) to U.S. Provisional Patent Application Ser. No. 62/025,469, filed 16 Jul., 2014, and U.S. Provisional Patent Application No. 62/043,495, filed 29 Aug., 2014, the entire contents of both of which are expressly incorporated herein by reference.

BACKGROUND OF THE INVENTION

Technical Field

Aspects of the embodiments relate to wireless networks and more specifically to systems, devices and methods for determining the quality of one or more communications links in a wireless network.

Background Art

Control networks in homes are increasingly popular installations. A network of sensors and control devices distributed throughout a residential or commercial building can control and provide information for various elements of the building. For example, one or more control networks in a home can control and monitor lighting, heating, ventilation and air conditioning (HVAC), and audio-visual (AV) equipment.

Increasingly, these control networks comprise one or more personal area networks (PANs) that are organized and in communication with other PANs and the control system. Such communications can include conflict resolution mechanisms, among others. Generally, these PANs allow each device to communicate with each other, thereby providing multiple possible routes between nodes over which a packet can be routed. This is in contrast to traditional networks in which devices generally communicate through a master or a repeater.

FIG. 1 illustrates a block diagram of a first PAN 100. PAN 100 is a network topology in that uses a source routing format. In the source routing format, only the nodes in a proscribed route are actively involved in propagating the message. In some cases, a broadcast message can be used that involves all or most of the other nodes, but that typically does not happen. Nonetheless, all of the nodes can cooperate in the distribution of data in PAN 100, but typically do not, as described above. PAN 100 typically has a self-healing capability that enables data rerouting when one node breaks down or a connection goes bad. As a result, Pan 100 is typically quite "robust" or reliable, as there is often more than one path between a source and a destination in PAN 100. Although mostly used in wireless situations (shown as dashed lines), PAN 100 is also applicable to wired networks (solid lines) and software interaction. PANs 100 are applicable to data only, as power cannot be effectively be transferred wirelessly.

While PANs 100 can be implemented with either a flooding technique or a routing technique to transmit messages, the former is less preferred. That is because the flooding technique incurs massive bandwidth overhead in exchange for their lightweight protocol overhead, making them very inefficient. When using a routing technique, the message is propagated along a path, by hopping from one PAN 100 node 104 to the next node 104 until the destination is reached (e.g., first PAN 100 node 104a to second PAN 100 node 104b, and so on). To ensure the availability of all of its paths, a routing network must allow for continuous connections and reconfiguration around broken or blocked paths using self-healing algorithms.

When nodes 102, 104, and 106 are all connected to each other in PAN 100, it is commonly referred to as a fully connected network. Node 102 is a special node, and can be referred to as coordinator node 102; nodes 104 can be further defined as fully functioning device (FFD) nodes (FFD node 104), or reduced function device (RFD) nodes (RFD node 106). Node 110, which is not always required, can be referred to as diagnostic node 110. Diagnostic node 110 provides a user with the ability to ascertain the communication link status within PAN 100. Diagnostic node 110 is substantially similar in function as diagnostic console 210 shown and described in reference to FIG. 2, and thus a detailed discussion is made in reference thereto. Coordinator node 102, FFD node 104, and RFD node 106 are described in greater detail below. A fully connected network can be costly, as either a wired connection is required between each node (or computer) or a wireless interface needs to be installed. Of course, the wireless interface can save wiring costs, but can also prove to be less reliable (and slower) under some conditions, as those of skill in the art can appreciate.

As shown in FIG. 1, PAN 100 comprises coordinator node 102 in wired communication with FFD nodes 104a and 104b (solid lines), and in wireless communication (dashed lines) FFD nodes 104a and 104b. FFD node 104a is in wired communications with FFD node 104c, and is in wireless communication with FFD nodes 104b and 104c. FFD node 104b is in wired and wireless communications with RFD node 106, and RFD node 106 is in both wired and wireless communications with FFD node 104d. While all of the nodes of PAN 100 have wireless communications capabilities, for certain reasons (distance, interference, among other reasons), not all nodes can communicate wirelessly with all other nodes. It is noted, however, that RFD node 106, while in both wired and wireless communications with FFD node 104d, cannot route messages to FFD 104, although it can communicate its own messages to FFD 104.

Communication protocols govern the operation of wireless PANs 100 by governing network formation, communication, interferences and other operational characteristics. For example, one such protocol is the Zigbee protocol from the Zigbee Alliance. The Institute of Electric and Electronic Engineers (IEEE) 802.15.4 standard specifies the physical layer and media access control for low-rate wireless personal area networks (LR-WPANs). It is maintained by the IEEE 802.15 working group, which defined it in 2003. It is the basis for the ZigBee, International Society of Automation (ISA) 100.11a, WirelessHART, and MicroChip's "MiWi" specifications, each of which further extends the standard by developing the upper layers which are not defined in IEEE 802.15.4. Another wireless communication protocol is the infiNET EX protocol from Crestron Electronics, Inc. of Rockleigh, N.J. Based on ZigBee PRO technology, infiNET EX is an extremely reliable and affordable protocol that is employed by 2-way wireless light dimmers, light switches, thermostats, keypads and other wireless sensors and control devices, described below in regard to FIG. 2.

Wireless mesh network devices within in a Zigbee or infiNET network (from hereon in referred to as PAN 100) can be classified as coordinator node 104, FFD node 104, and RFD node 106. PAN Coordinator node (coordinator node) 102 is the device that is responsible for starting the formation of PAN 100. There is only one coordinator 102 in any PAN 100. Coordinator node 102 chooses the PAN identification (PAN-ID), the 16-bit value that is used to uniquely define PAN 100.

FFD node 104 is a device that can route communication packets as part of its normal operation. FFD node 104 can also be called a "router." FFD nodes 104 form the network topology by establishing communications links to other devices (both FFD nodes 104 and RFD nodes 106). FFD nodes 104 can act as a sensor, actuator or other type of node.

RFD node 106 is a device that cannot route communication packets. They are always associated with a single FFD node 104, and can only participate in PAN 100 as an end node, or leaf node.

Wireless networks, such as Zigbee or infiNET networks, are formed by an initialization process. Typically, many of configuration properties can be preconfigured prior to initialization. By preconfiguring these properties, an administrator can determine the size and shape of the network. For example, the maximum number of links from PAN coordinator 102 to the furthest device can influence the shape and size of the network. The maximum number of devices that can connect to FFD node 104 can also determine the shape and size of the network. According to an aspect of the embodiments, coordinator node 102 can specify the number of devices that can link to FFD node 104, as well as how many of these devices can be routers themselves. According to further aspects of the embodiments, however, device applications can decide what node type they are, and they can define how many RFD devices can route through them.

Coordinator 102 is responsible for initializing wireless PAN 100. First coordinator 102 chooses a suitable radio channel on which to operate. Next, coordinator 102 assigns a PAN ID to the network. The PAN ID can be pre-configured or alternatively can be chosen by detecting other networks operating in the same frequency channel and choosing a PAN ID that does not conflict with theirs. Coordinator 102 also assigns a network address to itself. Typically, this address is zero (0).

Once coordinator 102 is finished configuring itself, it starts itself in a PAN coordinator mode. It is then prepared to field queries from other devices wishing to join the network through a commissioning process. Other devices, both FFD nodes 104 and RFD nodes 106, can join the network once PAN 100 has been created by coordinator 102. Coordinator 102 has the capability to allow other nodes to join. Additionally, FFD nodes 104 can also allow other nodes to join.

Devices join PAN 100 through a commissioning process. First, the new device (i.e., the new node) scans available channels to find a wireless network. The device then selects a discovered network by choosing a router or network coordinator on that network. Once this is done, the device sends a join message to the desired router or network coordinator, either FFD node 104 on PAN 100 or coordinator node 102.

However, PANs 100 do not always work as well upon commissioning or changes to the operating environment. Due to the complexity of the system and the transparent nature of their operation, it is not always easy to diagnose issues within the system.

Typically, the information available via communications from stack software is not useful for troubleshooting problems encountered in the field. This is largely due to the typical performance metrics being reported from the stack software being based on a very narrow spectrum of data that is itself frequently not useful. Such stack software analyzes communication events it is involved in, such as message delivery, message delivery failure, receive energy levels, and received data errors. As those of skill in the art can appreciate, the "stack" implements the lowers layers of communication, and provides an interface that can access a limited set of information it maintains, such as the ZLDU value, and event counters that can be used in system-level debugging. One example of such a stack software analysis program has been developed by EmbernetZNet; it includes a pre-compiled library, as well as some source files, that can be readily implemented to perform stack layer analysis.

Installers and field support individuals are left with a "pass/fail" type result with no indication of the cause of problems. Further, in certain applications, even a "pass/fail" test is not effective.

Accordingly, there is a need for an improved system of diagnosing issues within a personal area network such as mesh network 100.

SUMMARY OF THE INVENTION

It is to be understood that both the general and detailed descriptions that follow are exemplary and explanatory only and are not restrictive of the invention.

DISCLOSURE OF INVENTION

Accordingly, a need exists for an improved system, device and method for diagnosing communications issues in a wireless personal area network such as a mesh network. Aspects of the embodiments provide these advantages and others not specifically mentioned above but described in the sections to follow.

An object of the embodiments is to substantially solve at least the problems and/or disadvantages discussed above, and to provide at least one or more of the advantages described below.

It is therefore a general aspect of the embodiments to provide systems, methods, and modes for debugging a wireless network that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a method for determining an operational status of a wireless network system is provided comprising monitoring a plurality of quality of service (QoS) communication indicators by a node of at least two or more nodes of the network system, generating a first application link quality indicator (ALQI) by the node based on a first subset of the plurality of QoS communication indicators according to a first time period, and modifying the first ALQI with a second subset of the plurality of the plurality of QoS communication indicators only when a first predetermined threshold number of occurrences of the second subset of the plurality of QoS communication indicators has occurred without regard to the first time period to form a first modified ALQI. According to the first aspect of the embodiments, the method further comprises transmitting the modified ALQI by the first node to a second node in the network system, and wherein the first node is any one of a plurality of network nodes that can include a fully functioning node, and a reduced functioning node, and further wherein, the second node is a gateway node, and further wherein the method further comprises, determining a corrective action by the gateway device based on either or both of the ALQI and modified ALQI.

According to a second aspect of the embodiments, a method for determining an operational status of a wireless network system is provided, comprising monitoring a plurality of quality of service (QoS) communication indicators by a first node of at least two or more nodes of the network system, generating a first application link quality indicator (ALQI) by the first node based on a first subset of the plurality of QoS communication indicators according to a first time period, and modifying the first ALQI with a second subset of the plurality of the plurality of QoS communication indicators only when a first predetermined threshold number of occurrences of the second subset of the plurality of QoS communication indicators has occurred without regard to the first time period to form a first modified ALQI.

According to the second aspect of the embodiments, the method further comprises transmitting the modified ALQI by the first node to a second node in the network system, and wherein the first node is any one of a plurality of network nodes that can include one or more fully functioning nodes, and one or more reduced functioning nodes, and further wherein, the second node is a gateway node, and further wherein the method further comprises determining a corrective action to correct communication link errors by the gateway device based on either or both of the ALQI and modified ALQI.

According to the second aspect of the embodiments, the corrective action can include one or causing the first node to change channels, increase transmission power, and increase receiver sensitivity, and the gateway node can communicate one or both of the received ALQI and modified ALQI to a diagnostic console connected via a wireless or wired connection to the gateway node.

Still further according to the second aspect of the embodiments, the step of generating the first ALQI comprises evaluating the following expression—

$$ALQI=255-\min[\Sigma ALQIP,255],$$

wherein ALQIP comprises the first subset of the plurality of QoS communication indicators.

According to the second aspect of the embodiments, the step of generating the modified ALQI comprises evaluating the following expression—

$$ALQI=255-\min[\Sigma ALQIP,255],$$

wherein ALQIP comprises the first and second subset of the plurality of QoS communication indicators.

Still further according to the second aspect of the embodiments, the number of occurrences of the second subset of the plurality of QoS communication indicators is four. According to the second aspect of the embodiments, the first subset of QoS communication indicators comprises fields 16-22 of a link debug data reporting packet that is generated and transmitted by the first node to the second node, and the second subset of QoS communication indicators comprise field 23 of the link debug data reporting packet.

According to the second aspect of the embodiments, field 16 of the link debug data reporting packet is defined as an APF field, and is based on an APS failure rate (APSFR), and is assigned a range of values from 0 to 64, and wherein APSFR is defined as the percent of application messages that fail to be delivered from the first node to the second node, field 17 of the link debug data reporting packet is defined as an CCA field, and is based on a BUSY rate, and is assigned a range of values from 0 to 48, and wherein the BUSY rate is an approximate percentage of time that airspace around the first node is considered "busy" and therefore unable to communicate, field 18 of the link debug data reporting packet is defined as an APR field, and is based on an APS layer retry rate (APSRR), and is assigned a range of values from 0-64, and wherein APSRR is the percentage of APS send events that are retries for an existing message, field 19 of the link debug data reporting packet is defined as an MCF field, and is based on a MAC failure rate (MACFR), and is assigned a range of values from 0 to 32, and wherein MACFR is the percentage of MAC transmission attempts that fail, field 20 of the link debug data reporting packet is defined as an MCR field, and is based on a MAC retry rate (MACRR), and is assigned a range of values from 0 to 32, and wherein MACRR is the percent of MAC transmission attempts that are retries, field 21 of the link debug data reporting packet is defined as an RXC field, and is based on an amount of corrupt received messages (RXCORR), and is assigned a range of values from 0 to 16, field 22 of the link debug data reporting packet is defined as an NTT field, and is based on a network turnover (NTRNVR), and is assigned a range of values from 0 to 16, and wherein NTRNVR is the amount of turnover in the first node's neighbor table, and field 23 of the link debug data reporting packet is defined as an MTT field, and is based on time between map-to-one route requests (TBMT), and is assigned a range of values from 0 to 16, and wherein the TBMT is an average number of seconds between receiving map-to-one requests received.

According to the second aspect of the embodiments, the MTT can be calculated according to the following expression—

$$MTT_{ALQIP}=(180-TBMT)\times 3/32$$

wherein, MTT is not reported unless a number of occurrences of TBMT is greater than or equal to four, and further wherein MTT is determined based on the last four occurrences of TBMT, regardless of the number of TBMT occurrences.

Still further according to the second aspect of the embodiments, the first time period is about one minute, and wherein the method further comprises generating a Zigbee link quality indicator (ZLQI) based on a third subset of the plurality of the plurality of QoS communication indicators, and wherein the third subset of QoS communication indicators comprises fields 5-15 of a link debug data reporting packet that is generated and transmitted by the first node to the second node, and wherein ZLQI is maintained over a runtime of the first node.

According to a third aspect of the embodiments, the methods as described herein can be used in a network as manufactured by Creston Electronics Inc., of Rockleigh, N.J.

According to a fourth aspect of the embodiments, a system channel can be changed in view of the ALQI and modified ALQI field data value to improve overall system communications. According to the fourth aspect of the embodiments, the system channel is changed in response to the QoS data being substantially continuously collected.

BRIEF DESCRIPTION OF DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

FIGS. 7A, 7B, and 7C illustrate three tables of link debug data for several nodes of a personal area network such a Zigbee network for use in accordance with aspects of the embodiments.

DETAILED DESCRIPTION OF THE INVENTION

Figure 1:
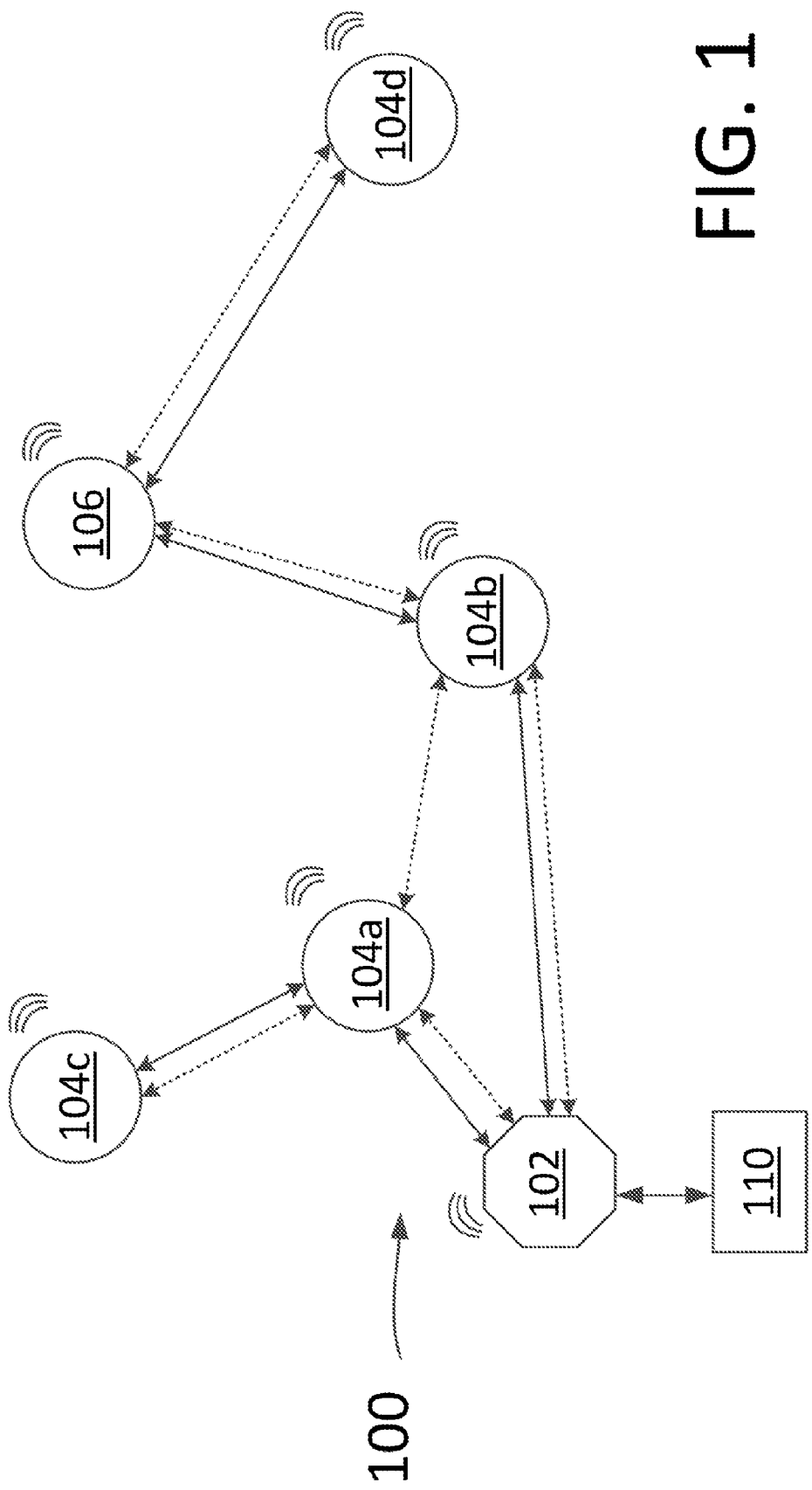
FIG. 1 illustrates a block diagram of a mesh network and communication paths therein.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as personal area networks that can include mesh networks.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Mesh Network
102 Coordinator Node
104 Full Function Device (FFD) Node
106 Reduced Function Device (RFD) Node
110 Diagnostic Node
200 Personal Area Network (PAN)
202 Gateway Device
204 Lighting Control
206 Thermostat
208 Wireless Expander
210 Diagnostic Console
250 Control System
251 Control Processor (Processor)
252 Lighting Control
253 Control System Bus (Ethernet, USB, RS232, Cresnet)
254 Sky Light Control
256 Drapery Control
258 Shade Control
260 HVAC Control
262 Audio Video Elements
264 Household Appliance Elements
266 Security Elements
302 Radio Frequency Transceiver Interface
303 Antenna
304 Power-On Indicator
306 Network Indicator
308 Activity Indicator
310 Acquire Button
312 Setup Button
314 LAN Power Over Ethernet (POE) Connector
316 CrestNet Interface
318 Processor
320 Processor Internal Memory
322 Executable Program/Application (App)
402 Integrated Display/Touch-Screen (laptop/tablet etc.)
404 Internal Data/Command Bus (Bus)
410 Universal Serial Bus (USB) Port
416 Hard Disk Drive (HDD)
418 Read-Only Memory (ROM)
420 Random Access Memory (RAM)
432 Processor Board/PC Internal Memory (Internal Memory)
434 Flash Drive Memory
442 Wi-Fi Transceiver
444 BlueTooth (BT) Transceiver
446 Near Field Communications (NFC) Transceiver
452 Antenna
456 Universal Serial Bus (USB) Cable
458 Ethernet Cable (CAT5)
502 Diagnostic Console Wired Input/Output Interface
504 Diagnostic Console Display/Touchscreen
506 Diagnostic Console Buttons
508 Diagnostic Console Keypad
510 Diagnostic Console Microphone
512 Diagnostic Console Speaker
602 Mode Button

604 Fan Button
606 Display
608 Up Button
610 Down Button
700a,b First and Second Link Debug Table
702 Link Debug Data Reporting Packet
800 Method for Diagnosing Communication Links in a Personal Area Network
802-816 Method Steps for Method 800
The following is a list of the acronyms used in the specification in alphabetical order.
ALQI Application Link Quality Indicator
APS Application Support Sublayer
APSFR APS Layer Transmit Failure Rate
APSRR APS Layer Transmit Retry Rate
ASIC Application Specific Integrated Circuit
AV Audio/Visual
BFEXH Buffer Exhaustion on a Network Device
BIOS Basic Input/Output System
BT Blue Tooth
CD Compact Disk
CPU Central Processing Unit
CSC Crestron Shade Control
DVD Digital Versatile Disk
EEPROM Electrically Erasable Programmable Read Only Memory
EUID Effective User Identification
FFD Full Function Device
FPGA Field Programmable Gate Array
GAN Global Area Network
H Hex
HDD Hard Disk Drive
HVAC Heating, Ventilation, Air Conditioning
I/O Input/Output
IEEE Institute of Electrical and Electronic Engineers
ISA International Society of Automation
ISM Industrial, Science, and Medical
LAN Local Area Network
LED Light Emitting Diode
LQI Link Quality Indicator
LR-WPAN Low Rate Personal Area Network
MAC Media Access Control
MACFR MAC Layer Transmit Failure Rate
MACRR MAC Layer Transmit Retry Rate
MTORR RX Map-To-One Route Requests Received
NFC Near Field Communications
NIC Network Interface Card
NTRNVR Network Device's Neighbor Table Turnover
PAN Personal Area Network
PAN ID Personal Area Network Identification
PHY Physical Layer
RAM Random Access Memory
RF Radio Frequency
RFD Reduced Function Device
RISC Reduced Instruction Set
ROM Read Only Memory
RSSI Received Signal Strength Indication
RXCORR Received Corrupt Message Rate
TBMT Time Between Map-to-one Route Requests
TSID Transport Stream Identification
TSID Transmitter Subscriber ID/Crestron Touch Settable ID
USB Universal Serial Bus
UWB Ultra-Wide Band
WAN Wide Area Network
ZLQI Zigbee (stack layer) Link Quality Indicator

MODE(S) FOR CARRYING OUT THE INVENTION

Aspects of the embodiments provide a wireless personal area network (PAN) operating according to one of a plurality of wireless communications protocols and comprising one or more network devices. The PAN is configured for employing a debugging or diagnostic apparatus and process that provides extended communication diagnostic data. The PAN diagnostic process and apparatus provides several sources of information to provide installers a more detailed picture as to why communication problems can exist in the PAN.

According to further aspects of the embodiments, high (i.e. application-detected) and low (i.e. stack detected) information are combined to determine in a more effective and efficient manner the quality of a communication link in a PAN. Typical solutions for 15.4/Zigbee networks, as provided by stack software, are forced to use the lowest layer only (i.e., the media access control (MAC) and physical (PHY) layers), which greatly restrict the information available for analyzing and diagnosing communication link errors. As those of skill in the art can appreciate, this restriction is the result of an Institute of Electrical and Electronic Engineers (IEEE) 15.4 requirement for ascertaining link quality that the physical (PHY) layer has to be able to determine the value. This restriction not only severely limits the information available in the Zigbee LQI ("ZLQI") determination, but also means the quality of the ZLQI determination is poor, and it is based on only one data source (the received frame error rates). As those of skill in the art can appreciate, the ZLQI measurement is a characterization of the strength and/or quality of a received packet. The measurement may be implemented using receiver ED, a signal-to-noise ratio estimation, or a combination of these methods. The use of the ZLQI result by the network or application layers is not specified in this standard.

The ZLQI measurement can be performed for each received packet, and the result can be reported to the MAC sublayer using PD-DATA.indication as an integer ranging from 0x00 to 0xff. The minimum and maximum LQI values (0x00 and 0xff) should be associated with the lowest and highest quality IEEE 802.15.4 signals detectable by the receiver, and LQ values in between should be uniformly distributed between these two limits. At least eight unique values of LQ can be used. Using PHY-layer only in the ZLQI limits the usability of the ZLQI value. The method used in the prior art versions (at least in earlier hardware/stack versions) is based on the receiver correlation error on incoming data—data can be received correctly but with errors in it, the more errors, the worse the ZLQI. The problems with this method are poor rangeability (very few effective "quality" levels), and incomplete data application. In addition, once error rates become too high to successfully decode a packet, that event fails to become factored into the ZLQI; as a result, intermittent links do not properly drag down the ZLQI value because the "failed" receptions (that totally fail decoding) do not get applied to the ZLQI value.

According to aspects of the embodiments, communication link information is automatically reported by the devices periodically and collected by PAN 100. PAN 100 then makes available the collected communication link information, which is organized by gateway console command, thereby allowing conditions in all areas of the network to be quickly assessed. According to aspects of the embodiments, one method to retrieve the data is by console command in the gateway/mc3; in this method, the user can open a software tool such as Crestron Toolbox to get a "console window" in which simple text-based commands can be sent and text responses received. This data can be retrieved by a Simpl+ program to be formatted and sent to conventional user interfaces such as TouchPanel, which is a type of application that can be used in the system described herein according to aspects of the embodiments. According to further aspects of the embodiments, other interfaces for control applications, such as Pyng, can be used in which data can be reported to the Pyng application without having to issue console commands and parse responses. According to further aspects of the embodiments, a derived link quality indicator (LQI) metric can be generated. The LQI is based on an aggregation of the collected communication link information. According to still further aspects of the embodiments, a second derived link quality indicator can also be generated, and is referred to as an "application LQI" (ALQI). The ALQI provides a relatively quick assessment of communication quality. A detailed discussion of the determination of both the LQI and ALQI is made below, in reference to FIG. 7. In addition, an interpretation of the determined values of LQI and ALQI is also described in detail below.

Aspects of the embodiments are described herein in the context of a PAN (e.g. PAN 200) operating with proprietary wireless network protocols, such, e.g., the infiNET EX protocols, and wherein the PAN comprises one or more of a lighting device, a drapery device, a shade device, an HVAC device (such as a thermostat), a control processor, and a wireless gateway as the network devices of the PAN, but is not limited thereto. Those of skill in the art can appreciate that in accordance with currently available personal area network communications technology, virtually any household device, as well as virtually any commercially used device, can be interfaced with one or more communications devices that can make the interfaced device part of the PAN. Consequently, the above list is not limiting, and should not be taken in such regard. Any device configured for communicating on a wireless network such as PAN can serve as the joining device. For example, any one or an AV device, a security device, a household appliance, a portable communication device, among virtually any household or commercially used devices can be a network device in the PAN.

Figure 2:
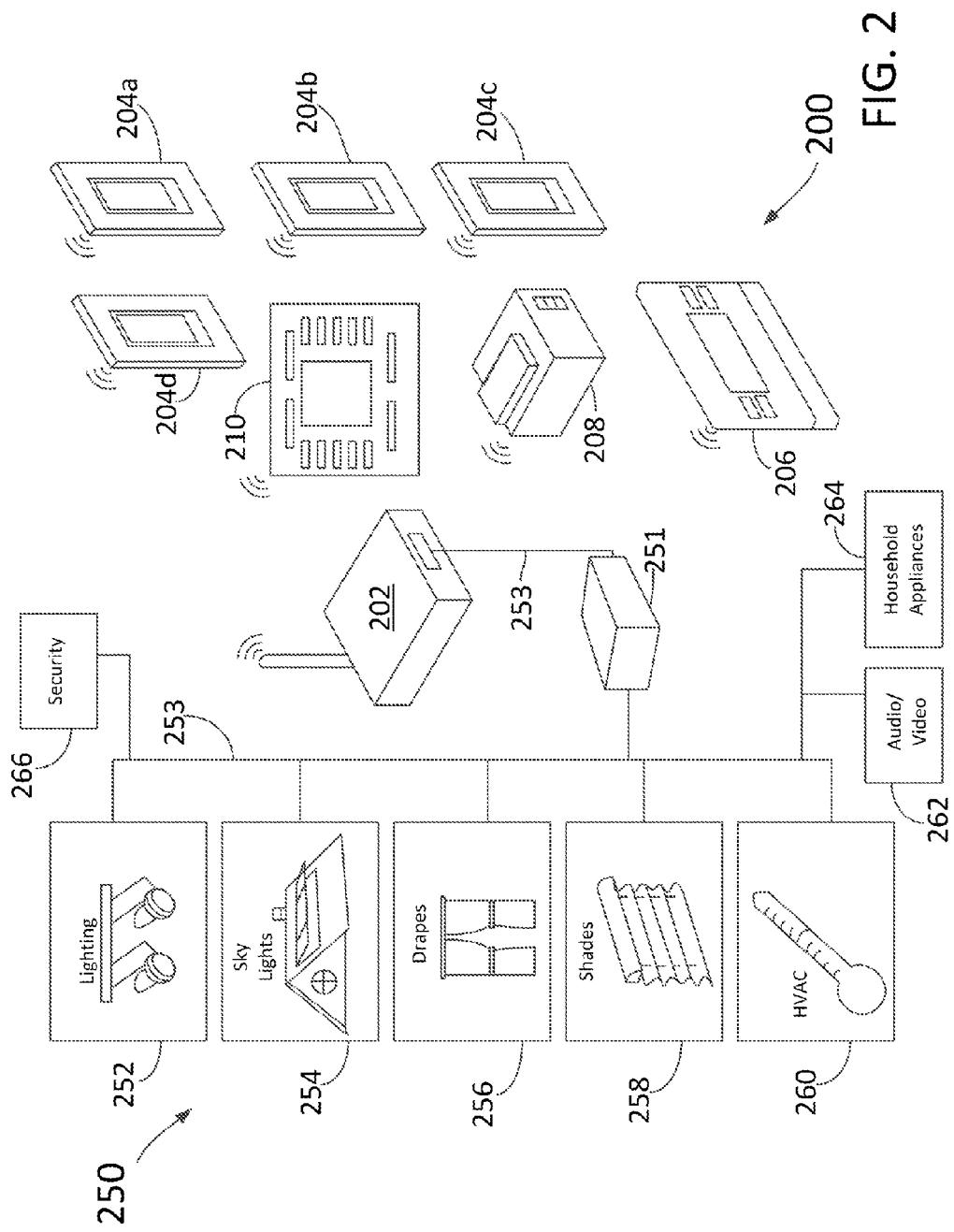
FIG. 2 illustrates a wireless personal area network that implements a system and method for diagnosing communication links within the personal area network according to aspects of the embodiments.

FIG. 2 illustrates wireless PAN 200 (PAN 200) operating according to wireless protocols (e.g., infiNET) and connected to control system 250 according to aspects of the embodiments. PAN 200 comprises one or more network devices such as a wireless gateway (gateway device) 202 acting as a PAN coordinator (e.g., coordinator node 102) and communicating with a variety of other network devices including a plurality of lighting controls 204a-d, thermostat 206, wireless expander 208 and diagnostic console 210, each of which act as either FFD nodes 104, or RFD nodes 106 (with the exception of diagnostic console 210, discussed in greater detail below). According to an aspect of the embodiments, PAN 200 can be operating according to a proprietary communication protocol, such as infiNET EX protocols. According to this embodiment, gateway device 202 can be a CEN-RFGW-EX infiNET EX wireless gateway available from Crestron Electronics, Inc. of Rockleigh, N.J. Lighting controls 204 can comprise infiNET EX wall box controls such as CLW-DIMEX-P and CLW-DIMSWEX-P and a dimmer such as a CLW-LDIMEX infiNET lamp dimmer, all available from Crestron Electronics, Inc. of Rockleigh N.J. Wireless expander 208 can be a CLW-EXPEX infiNET wireless expander available from Crestron Electronics, Inc. of Rockleigh N.J. Diagnostic console 210 can be embodied in a touch panel form, such as in a MTX-3 Isys™ 2.8" Handheld Wireless Touch Panel w/infiNET EX, which also available from Crestron Electronics, Inc. of Rockleigh N.J.

Those skilled in the art will recognize that additional devices can operate within PAN 200. Substantially any device capable of communicating on PAN 200, such as AV controls, HVAC elements, security elements, and other residential or commercial control and monitoring devices can be part of PAN 200 shown in FIG. 1. For example, PAN 200 can also further comprise HVAC controls, such as a CHV-TSTATEX thermostats available from Crestron Electronics, Inc. of Rockleigh N.J., or shade controls such as Creston shade controls (CSC) that are also available from Crestron Electronics, Inc. of Rockleigh N.J.

Control system 250 can comprise control processor (processor) 251 adapted to control one or more controllable elements of a residential or commercial structure either directly or via intermediate components, and for interfacing with PAN 200 according to aspects of the embodiments. For example, processor 251 can control lighting elements 252, sky light elements 254, drapery elements 256, shade elements 258, AV elements 262, household appliance elements 264, security elements 266, and HVAC elements 260. Of the devices 251, 255, 254, 256, 258, 260, 262, 264, and 266 can act as either FFD nodes 104 or RFD nodes 106.

Figure 3:
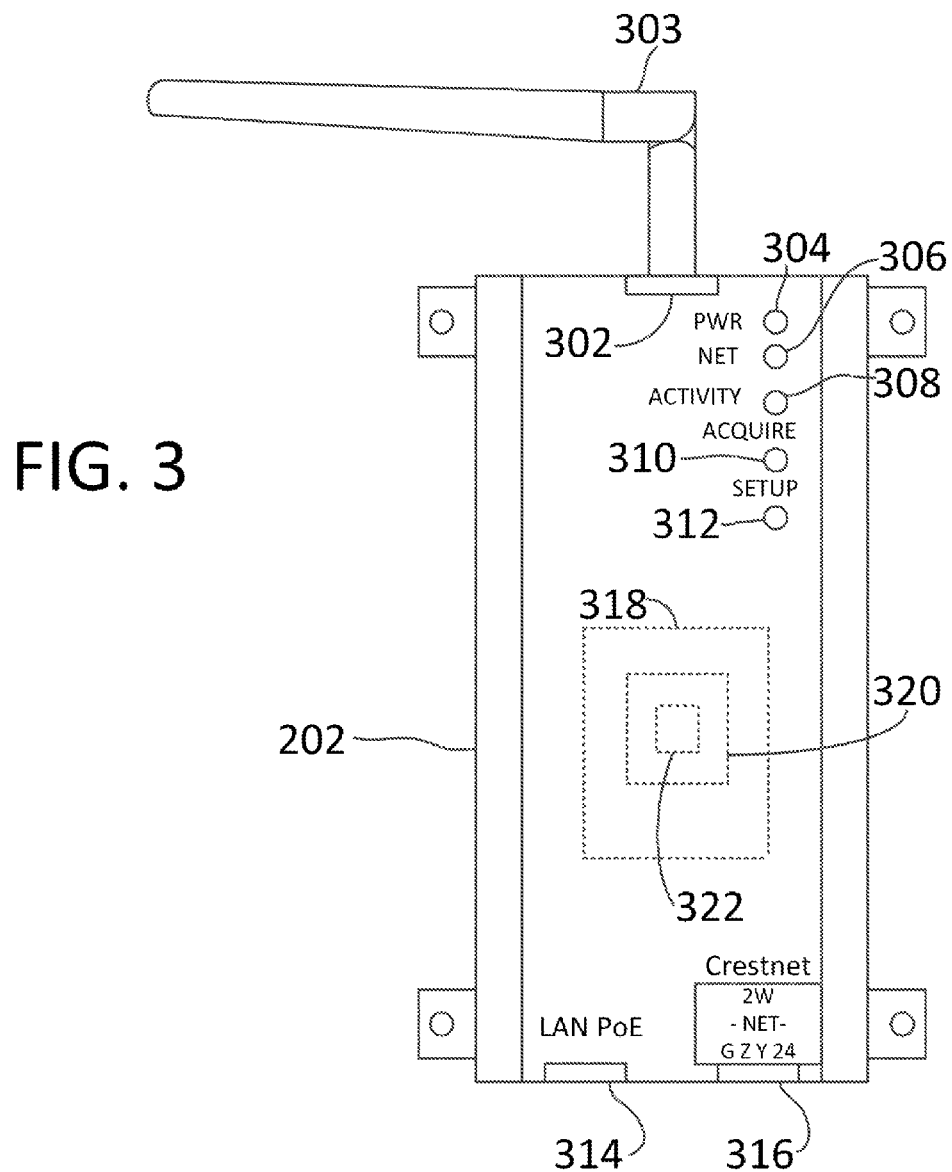
FIG. 3 illustrates a wireless gateway device for use in the wireless personal area network of FIG. 2 according to aspects of the embodiments.

FIG. 3 illustrates a wireless gateway device (gateway device) 202 according to an aspect of the embodiments. Gateway device 202 is adapted for acting as PAN coordinator node 102 and managing network configurations. Additionally, gateway device 202 is further adapted to serve as interface (or gateway) for PAN 200 to communicate with control system 250 according to aspects of the embodiments. Gateway device 202 can be a CEN-RFGW-EX wireless gateway available from Crestron Electronics, Inc. The CEN-RFGW-EX wireless gateway is a two-way RF gateway\transceiver designed to enable communications and management for a complete infiNET EX wireless network of dimmers, keypads, remotes and other devices. The CEN-RFGW-EX wireless gateway links the infiNET EX network to a Crestron control system via a wired connection such as Ethernet or Cresnet. Up to one hundred infiNET EX dimmers, switches, keypads, thermostats, and other devices can be linked to a control system, such as control system 250, via a single CEN-RFGW-EX gateway adapted to perform as gateway device 202. Additional gateways can be installed to support more devices with up to sixteen gateways possible in a complete system. Wireless expanders 208 can also be added wherever needed to extend the network by filling in gaps between devices.

Gateway device 202 can include at least one central processing unit (CPU) 318. For example, CPU 318 can represent one or more microprocessors, and the microprocessors can be "general purpose" microprocessors, a combination of general and special purpose microprocessors, or application specific integrated circuits (ASICs). Additionally or alternatively, CPU 318 can include one or more reduced instruction set (RISC) processors, video processors, or related chip sets. CPU 318 can provide processing capability to execute an operating system, run various applications, and/or provide processing for one or more of the techniques described herein. Such an Applications that can run on the gateway device 202 can include, for example, software for initiating PAN 200, communicating on control system 250, and PAN communications link diagnostic software/application (App) 322.

Figure 4:
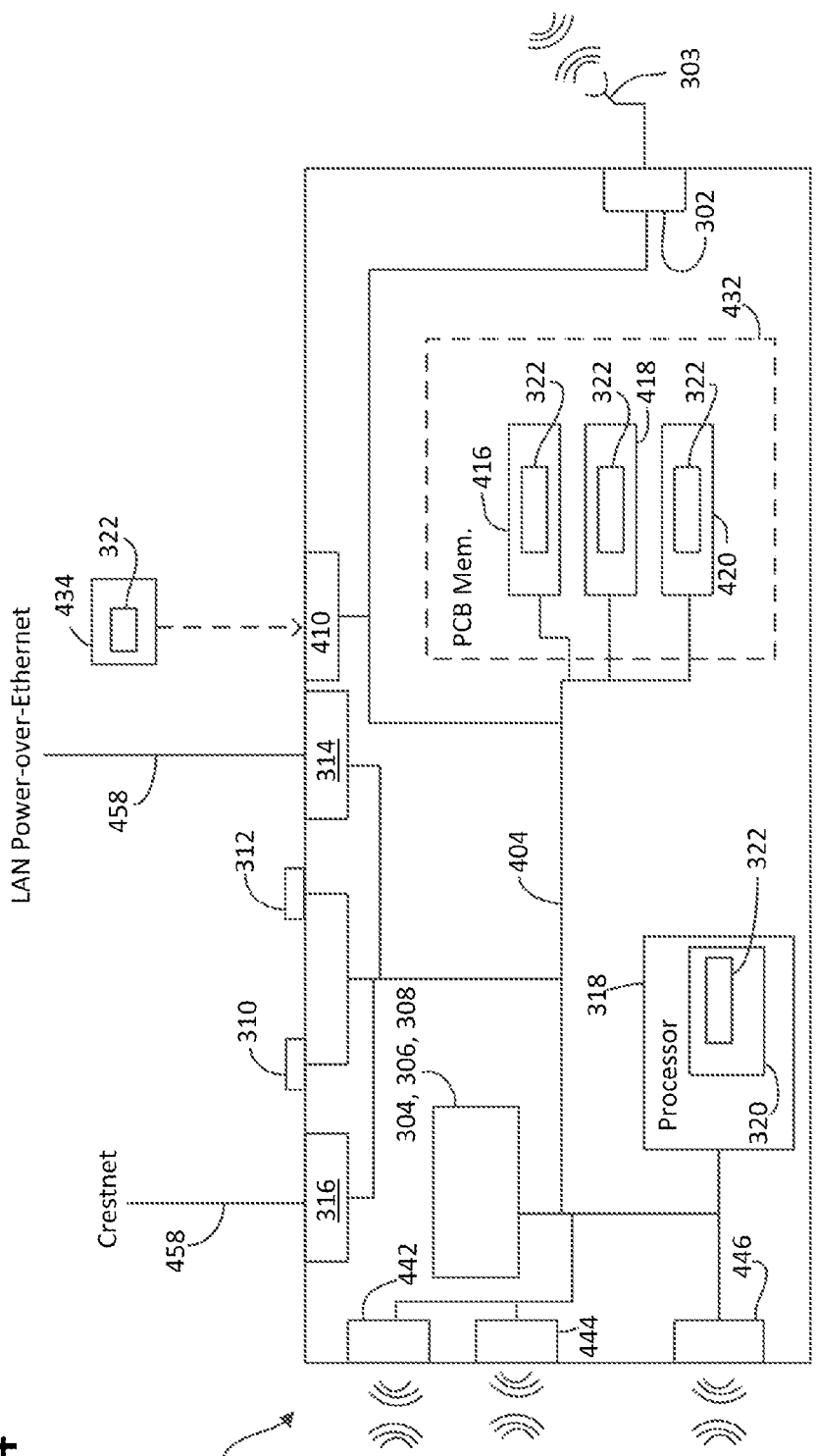
FIG. 4 illustrates a detailed block diagram of the main components of the wireless gateway device of FIG. 3 according to an aspect of the embodiments.

FIGS. 3 and 4 illustrate gateway device 202 suitable for use to implement method 500 for diagnosing communication links within a personal area network according to an embodiment. Gateway device 202 comprises, among other items, a shell/box/container, integrated indicators 304, 306, 308, internal data/command bus (bus) 404, processor board/PC internal memory (internal memory) 432, and one or more processors 408 with processor internal memory 406 (which can be typically read only memory (ROM) and/or random access memory (RAM)). Those of ordinary skill in the art can appreciate that in modern PC systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. Gateway device 202 further comprises multiple input/output ports, such as universal serial bus ports 410, LAN PoE 314, CrestNet interface 316, among other types. Gateway device 202 still further includes wireless communication apparatus, such as one or more of the following: Wi-Fi transceiver 442, BlueTooth (BT) transceiver 444, near field communications (NFC) transceiver 446, and RF transceiver interface 302, and antenna 303.

Internal memory 432 itself can comprise hard disk drive (HDD) 416 (these can include conventional magnetic storage media, but, as is becoming increasingly more prevalent, can include flash drive memory 434, among other types), read-only memory (ROM) 418 (these can include electrically erasable (EE) programmable ROM (EEPROMs), ultraviolet erasable PROMs (UVPROMs), among other types), and random access memory (RAM) 420. Usable with universal serial bus (USB) port 410 is flash drive memory 434. Each of the memory storage devices, or the memory storage media (406, 418, 420, 434, among others), can contain all or some of executable software programming code or application (application, or "App") 322, which can implement part or all of the portions of method 500 described herein. In addition, any of the memory devices can buffer or cache data. In buffering or caching data related to operations of processor 318, memory 320, 432 can store data associated with applications running on the gateway device 202.

As mentioned above, gateway device 202 further comprises a plurality of wireless transceiver devices, such as Wi-Fi transceiver 442, BT transceiver 444, NFC transceiver 446, RF transceiver device 302, and antenna 303. While each of Wi-Fi transceiver 442, BT transceiver 444, NFC transceiver 446, and RF transceiver device 302 has their own specialized functions, each can also be used for other types of communications, such as accessing a cellular service provider (not shown), accessing the internet, among other types communications and data/voice transfers/exchanges, as known to those of skill in the art. Each of Wi-Fi transceiver 442, BT transceiver 444, NFC transceiver 446, and RF transceiver device 302 includes a transmitting and receiving device, and a specialized antenna, although in some instances, one antenna can be shared by one or more of Wi-Fi transceiver 442, BT transceiver 444, NFC transceiver 446, and RF transceiver device 302. Alternatively, one or more of Wi-Fi transceiver 442, BT transceiver 444, NFC transceiver 446, and RF transceiver device 302 will have a specialized antenna, such as RF transceiver device 302 to which is electrically connected at least one antenna 303. Gateway device 202 can also be part of a larger network configuration as in a global area network (GAN) (e.g., the internet), which ultimately allows connection to various landlines.

According to further embodiments, integrated displays 304, 306, and 308, and acquire and setup buttons 310, 312 respectively, as well as CrestNet interface 316 and LAN PoE interface 314 can provide a means for a user to enter commands, data, digital, and analog information into gateway device 202, and to determine status as well. Integrated displays 304, 306, and 308 can be used to show visual representations of acquired data, and the status of applications that can be running, among other things.

Bus 404 provides a data/command pathway for items such as: the transfer and storage of data/commands between processor 318, Wi-Fi transceiver 442, BT transceiver 444, NFC transceiver 446, RF transceiver device 302, integrated displays 304, 306, and 308, buttons 310, 312, USB port 410, LAN PoE interface 314, and internal memory 432. Through bus 404, data can be accessed that is stored in internal memory 432. Processor 318 can send information for visual display to one or more of displays 304, 306, and 308, and the user can send commands to App 322 that can reside in processor internal memory 320 of processor 318, or any of the other memory devices (416, 418, 420, 434).

Gateway device 202, and either processor internal memory 320 or internal memory 432, can be used to implement method 500 for diagnosing communication links in a personal area network according to an embodiment. Hardware, firmware, software or a combination thereof may be used to perform the various steps and operations described herein. According to an embodiment, App 322 for carrying out the above discussed steps can be stored and distributed on multi-media storage devices such as flash drive memory 434 (described above) or other form of media capable of portably storing information. Storage media 434 can be inserted into, and read by devices such as USB port 410.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, compact disk (CD)-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD, or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a system and method for diagnosing communication links in a personal area network. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

As described above, gateway device 202 can also include nonvolatile storage. The nonvolatile storage can represent any suitable nonvolatile storage medium, such as HDD 416 or nonvolatile memory, such as Flash memory. Being well-suited to long-term storage, the nonvolatile storage can store data files, software (e.g., for implementing functions on gateway device 202), and wireless connection information (e.g., information that can enable media device to establish a wireless connection such as a telephone connection).

One or more network interfaces can provide connectivity for gateway device 202. The network interfaces can represent, for example, one or more network interface cards (NIC) or a network controller. In certain embodiments, the network interface can include a PAN interface, such as a two-way RF transceiver 302. RF transceiver 302 can provide capabilities to network with, for example, a Bluetooth® network, an IEEE 802.15.4 (e.g., ZigBee) network, or an ultra-wideband network (UWB). As can be appreciated, the networks accessed by RF transceiver 302 can, but do not necessarily, represent low power, low bandwidth, or close range wireless connections. RF transceiver 302 can permit one electronic device to connect to another local electronic device via an ad-hoc or peer-to-peer connection, as is evident of Mesh networks.

The network interface can also include one or more local area network (LAN) interfaces, such as LAN PoE interface 314. The LAN interface can represent an interface to a wired Ethernet-based network, but can also represent an interface to a wireless LAN, such as an IEEE 802.11x wireless network. The range of the LAN interface can generally exceed the range available via RF transceiver 302. Additionally, in many cases, a connection between two electronic devices via the LAN interface can involve communication through a network router or other intermediary device.

According to aspects of the embodiments, LAN PoE interface 314 is an 8-wire RJ-45 female connection with two LED indicators. Cresnet interface 316 is a 4-pin 3.5 mm detachable terminal block providing an interface for Cresnet proprietary communications on a LAN. LAN PoE interface can be adapted to receive both an electric power signal and an information signal from a control network. For example, LAN PoE interface can be connected through category 5 cable (CAT 5) to a LAN that contains both a power supply and multiple control points and signal generators. Through LAN PoE interface or Cresnet interface 316, gateway device 202 can interface with control system 250. For example, gateway device 202 can communicate with processor 251, such as a PRO3 available from Crestron Electronics, Inc.

Referring back again to FIG. 3, gateway device 202 comprises one or connectors, indicators and interface buttons. Gateway device 202 comprises RF transceiver interface 302 to which is attached antenna 303. Gateway device 202 further comprises power-on LED (PWR) 304, network LED (NET) 306 and activity LED 308. Power LED 304 is an LED indicating that operating power is being supplied whether from the Cresnet network or the PoE connection. Network LED 306 indicates communication with the Cresnet system. Activity LED 308 indicates wireless communications, such as with the elements of the wireless PAN 200.

Gateway device 202 further comprises acquire button 310 and setup button 312. Acquire button 310 and setup button 312 are recessed push buttons each with an indicator LED. Acquire button 310 is employed to configure communication with PAN 200 and setup button 312 is employed to configure communication with control system 250 according to further aspects of the embodiments. Discussion will now be made of how to configure communications between one or more nodes within PAN 200, and communications between PAN 200 and control system 250 according to aspects of the embodiments.

Gateway device 202 can be placed in acquire mode by pressing acquire button 310. The associated LED will indicate that gateway device 202 is in acquire mode when illuminated. Once gateway device 202 (i.e., as the coordinator node 102 of PAN 200) is placed in acquire mode, any device (e.g., any of the household or commercial devices that can become PAN 200 nodes, e.g., the "joining devices") that is within range of gateway device 202 or which can be brought into range, will receive a notification from coordinator node 102, and will internally go to an acquire mode so that it can be acquired by gateway device 202. The joining device will be automatically acquired by gateway device 202. Pressing acquire button 310 a second time will cause Gateway device 202 to exit acquire mode as indicated by an LED associated or part of acquire button 310, which will then extinguish.

Figure 5:
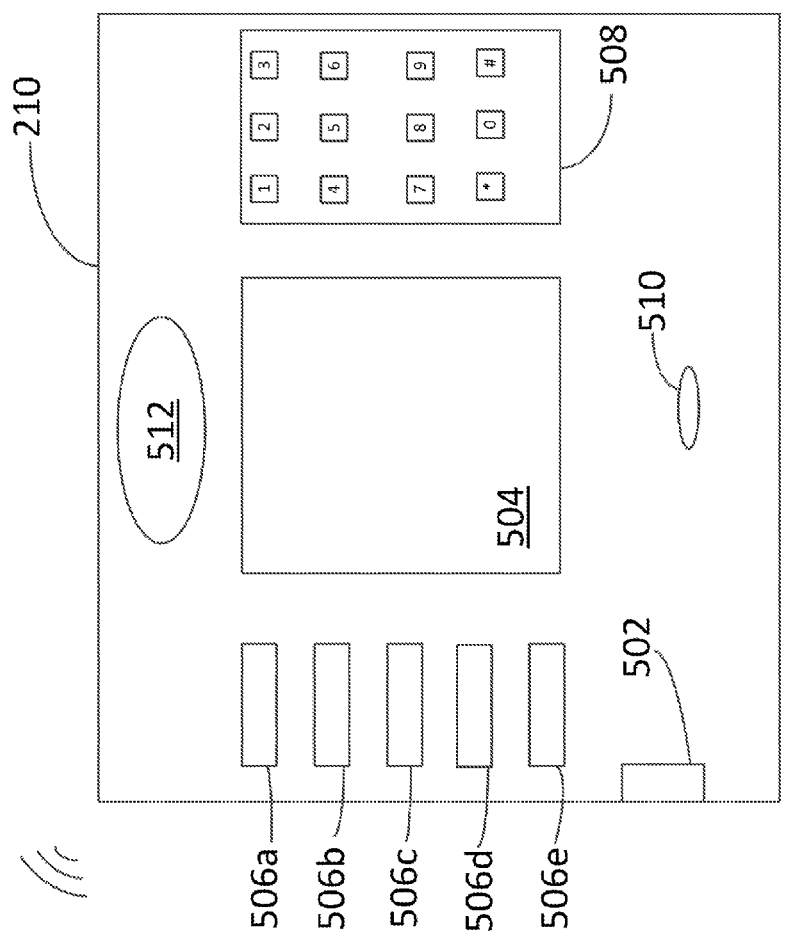
FIG. 5 illustrates a diagnostic console for use in the wireless personal network as shown in FIG. 1 according to aspects of the embodiments.

PAN 200 can further comprise diagnostic console 210, as shown in FIG. 2 and in greater detail in FIG. 5. As described above, the interface for joining devices such as thermostat 206 to PAN 200 can be limited in functionality and not capable of providing adequate information to an installer of PAN 200. Diagnostic console 210 can be a dedicated device or can represent an added functionality of an existing device, such as a tablet computer or smart phone (i.e., meaning that a special program or App has been added to the tablet or smart phone). According to one non-limiting example, diagnostic console 210 is being shown in FIG. 2 as being incorporated as, or part of, a separate device. As such, according to this non-limiting example, one or more network interfaces, e.g., gateway device 202, can provide connectivity for diagnostic console 210. According to aspects of the embodiments, gateway device 202 manages and communicates with one PAN 200, although according to further aspects of the embodiments, gateway device 202 can manage and communicate with more than one PANs 200. The network interfaces can represent, for example, one or more NICs, or a network controller. According to aspects of the embodiments, diagnostic console 210 operates to provide available debugging data to one or more users, regardless of the location of the user (e.g., the user can access diagnostic console 210 via one or more other networks, such as, but not limited to, wireless cellular networks, the internet, intranets (such as CresNet), among many other network types). Consequently, as described, diagnostic console 210 does not affect any aspect of network operation according to one non-limiting aspect of the embodiments. In other aspects, diagnostic console 210 can affect operation. According to further aspects of the embodiments, diagnostic console 210 can include such functionality as generating channel changes in response to system-wide communication problems, or provide troubleshooting steps/items of concern to the installer. In certain embodiments, the network interface can include a PAN interface, such as a two-way RF transceiver 302. The PAN interface can provide capabilities to network with, for example, a Bluetooth network, an IEEE 802.15.4 (e.g., ZigBee) network, or a UWB. As can be appreciated by those of skill in the art, the networks accessed by the PAN interface can be characterized as exhibiting low power, low bandwidth, or close range wireless connections, among other features. The PAN interface can permit one electronic device to connect to another local electronic device via an ad-hoc or peer-to-peer connection.

Diagnostic console 210 can also include wired input/output (I/O) interface 502 for a wired interconnection between itself and another electronic device, such as a joining device. The wired I/O interface can represent, for example, a universal serial bus (USB) port or an IEEE 1394 or FireWire® port, but can also represent a proprietary connection.

The wired interface of diagnostic console 210 can be further adapted to receive diagnostic information from the joining device, and diagnostic console 210 can further include display/touchscreen 504 for displaying the diagnostic information. For example, diagnostic console 210 can receive and display the table of discovered networks from the joining device. As those of skill in the art can appreciate, when a device joins a network such as PAN 200, or a mesh network, the joining device creates a table of networks that the joining device did join, or could have joined. According to further aspects of the embodiments, diagnostic console 210 does not typically perform its own commissioning process; however, as those of skill in the art can appreciate, according to further aspects, the commissioning process can be incorporated within diagnostic console 210. For example, diagnostic console 210 can be provided with such commissioning tools and can therefore generate its own table of entries for up to four discoverable networks (in an "acquire scan" application) that it may wish to join with. According to further aspects of the embodiments, gateway device 202 does not typically control what devices join to it, although according to further aspects of the embodiments such discrimination can be built-in or added as function to gateway device 202. According to further aspects of the embodiments, diagnostic console 210 can provide network technicians with the ability to diagnose problem installations and help them understand the wireless environment in which devices are placed. Such features could be implemented by allowing diagnostic console the ability to join an existing (or different) network, as opposed to the gateway it is currently attached to.

Diagnostic console 210 can further comprise one or more user interface elements for receiving and displaying information. For example, the one or more user interface elements can comprise one or more buttons 506a-e, keypad 508, microphone 510, speaker 512, and indicator lights/lamps (not shown).

Figure 6:
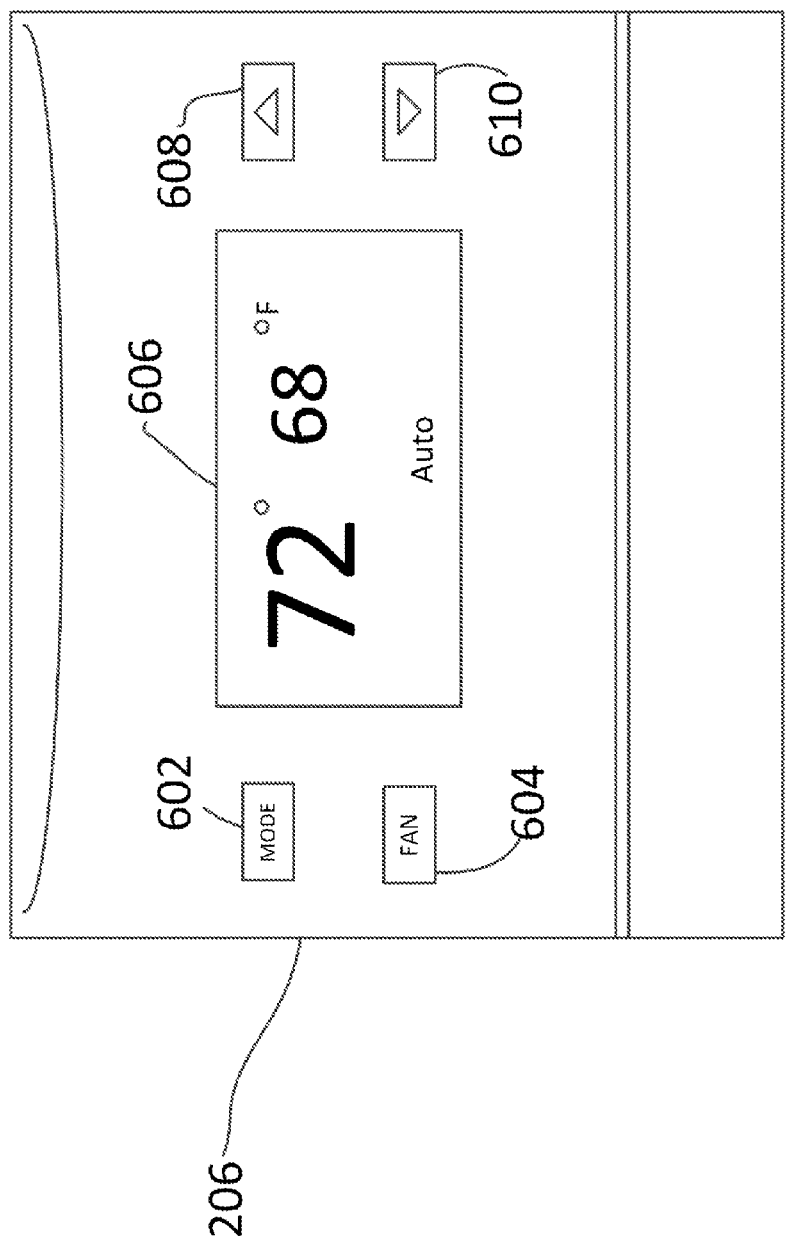
FIG. 6 illustrates a thermostat for use in the wireless personal network as shown in FIG. 1 according to aspects of the embodiments.

FIG. 6 illustrates thermostat 206 for use in PAN 200 as shown in FIG. 2 according to aspects of the embodiments. Thermostat 206 can be a CHV-TSTATEX thermostat available from Crestron Electronics, Inc. of Rockleigh, N.J. The CHV-TSTATEX thermostat can operate on PAN 200 by joining it and being acquired by gateway device 202 as described above.

Thermostat 206 is adapted to control heating and cooling of baseboard, forced air, heat pump and dual fuel heat pump HVAC systems. Thermostat 206 is further configured for communicating on PAN 200.

Thermostat 206 can include at least one CPU. For example, the CPU can represent one or more microprocessors, and the microprocessors can be "general purpose" microprocessors, a combination of general and special purpose microprocessors, or ASICs. Additionally, or alternatively, the CPU can include one or more RISC processors, video processors, or related chip sets. The CPU can provide processing capability to execute an operating system, run various applications, and/or provide processing for one or more of the techniques described herein. Applications that can run on thermostat 206 can include, for example, software for communicating on PAN 200 and controlling one or more HVAC elements 260.

A main memory can be communicably coupled to the CPU, which can store data and executable code. The main memory can represent volatile memory such as RAM, but can also include nonvolatile memory, such as ROM or flash memory. In buffering or caching data related to operations of the CPU, the main memory can store data associated with applications running on thermostat 206.

Thermostat 206 can also include nonvolatile storage. The nonvolatile storage can represent any suitable nonvolatile storage medium, such as a HDD or nonvolatile memory, such as flash memory. Being well-suited to long-term storage, the nonvolatile storage can store data files, software (e.g., for implementing functions on thermostat 206), and wireless connection information (e.g., information that can enable thermostat 206 to establish a wireless connection).

As discussed above, thermostat 206 can also include a wired input/output (I/O) interface for a wired interconnection between itself and another electronic device. The wired I/O interface can represent, for example, a USB port or an Institute of Electrical and Electronic Engineers (IEEE) 1394 or FireWire® port, but can also represent a proprietary connection.

Thermostat 206 further comprises LCD display 606 and one or more user interface buttons 602, 604, 608, and 610. Thermostat 206 can be placed in acquire mode via a series of menus displayed on LCD display 606. Selections are made via the one or more user interface buttons 602, 604, 608, and 610. For example, the user can enter a setup mode by pressing and holding fan button 604. While fan button 604 is being held, the user can then simultaneously press and hold both up button 608 and down button 610 for some period of time (e.g., five seconds) to enter setup mode. Once in setup mode, thermostat 206 can be placed in acquire mode by actuating mode button 602 twice and then selecting either up button 608 or down button 610. An LED display can then indicate that thermostat 206 is performing the scan and acquire process by flashing a " - - - " on display 606. Upon completion of the scan and acquire process, LED display 606 will indicate a "00" if thermostat 206 has successfully been acquired or an "E#" to indicate an error where # indicates an error code. For example, the error codes "E1", "E2" and "3" can correspond to the following conditions, respectively: no gateway found, gateway found but device rejected, and radio operation not available.

As described above, one or more devices in PAN 200 can collect and report data, and one or more devices can analyze this data to diagnose issues in PAN 200. According to aspects of the embodiments, and from hereon on, unless specifically described otherwise, "data" refers to a link debug data reporting packet. For example, network devices that can collect and report data include a CLWI-KPLEX In-Wall Wireless Lighting Keypad, and a CLWI-KPLEX-BATT In-Wall Wireless Lighting Keypad, both of which are available from Crestron Electronics, Inc., and both of which can be considered to be non-limiting examples of joining devices of PAN 200. The MC3 control processor and DIN-AP3MEX DIN rail 3 series automation processor can be considered as representative, but non-limiting examples of processor 251, and can analyze data from other devices in PAN 200. CEN-RFGW-EX gateway device, which can be considered a representative, but non-limiting example of gateway device 202, can also analyze data. All three of these devices are available from Crestron Electronics, Inc.

Routers and always-on devices report the data to the gateway as an average time between map-to-one route requests received (MTORR RXs) response. Routers, as those of skill in the art can appreciate, can be described as a device that participates in routing or moving a message from one place to another. Advantageously, this minimizes bandwidth consumption as the incremental increase in busy time (by adding this data) is very small. According to aspects of the embodiments, routers are defined as any node within PAN 200 that can route a message. An "always-on" device is a node that can hear any over-the-air messages, although it does not necessarily need to have to response to them or participate in routing them. According to further aspects of the embodiments, non-battery operated devices are typically designated as "always-on" and routers, while battery operated devices are typically designated as "end devices." An "end devices," according to aspects of the embodiments, does not have the responsibility and/or capability of routing messages, as a router-type device does. According to still further aspects of the embodiments, "busy time" is that time in which the device is not able to communicate because the energy level of the communication path is above some level, meaning that either noise is present, or other devices within PAN 100 are communicating, and the instant device would not be able to be heard above the existing energy levels.

Certain end devices, such as battery powered devices, report the data at times that are convenient for the application specific to the device in a manner that minimizes power impact. Such applications can include, by way of non-limiting example, software/firmware that implements one or more specific functionalities of the devices such as a button/LED user interface code in a keypad. According to further aspects of the embodiments, applications can include that software/firmware created by Crestron to implement the specific functionalities of the respective devices. In general this means it is reported when the application already needs to talk, in a manner that does not increase the over-the-air frame count. In an embodiment, a device such as the CLWI-KPLEX-BATT can piggyback the data on release edges of any button press. In other embodiments, battery powered network devices can piggyback the data on other events. For example, an occupancy sensor can piggyback the data on occupancy and vacancy events during the analog output for timeout. According to further aspects of the embodiments, multiple messages can be concatenated into one over-the-air packet so the App message (i.e. button press) and the link debug data packet can be sent in one transmit event.

Figure 8:
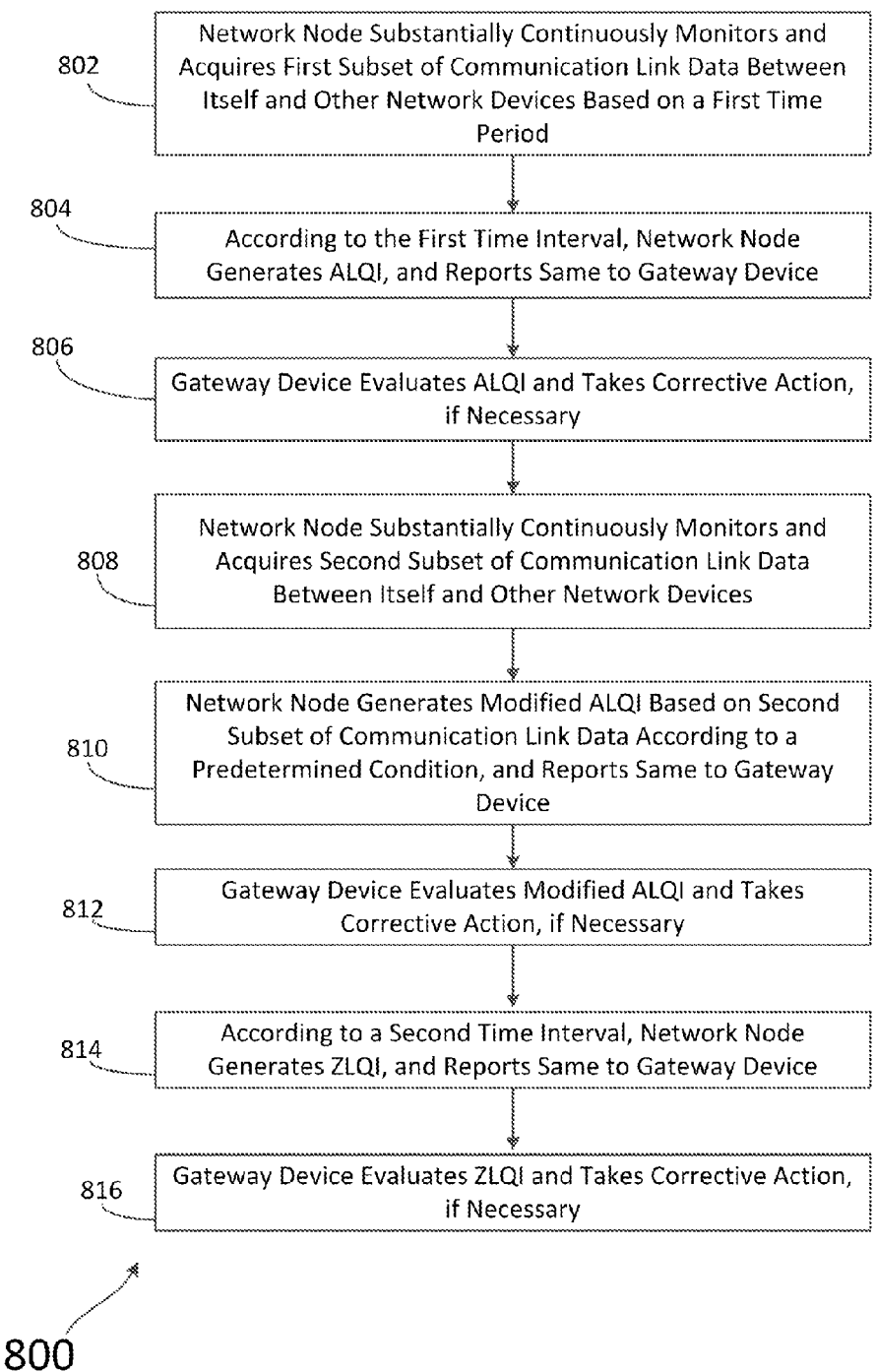
FIG. 8 illustrates a flowchart of a method for diagnosing communication links in personal area network according to aspects of the embodiments.

FIG. 8 illustrates a flowchart of method 800 for diagnosing communication links in PAN 200 according to aspects of the embodiments, and FIGS. 7A, 7B, and 7C illustrate tables that show a plurality of link debug table used in method 800 for diagnosing communication links in PAN 200 according to aspects of the embodiments. Referring back to FIG. 2, gateway device 202 can obtain and report link debug data by issuing a command to one or more network devices. The command issued to the network device obtains statistical information about the state of communication for the network device in relation to both their local environment (e.g., between the network device to which the command was issued and other network devices or devices that communicate with the network device (e.g., a wireless light switch can communicate wireless with gateway device 202 and the light(s) it controls)) and end-to-end communications between gateway device 202 and the network device. Once one or more of such commands have been issued, a table can be assembled by gateway device 202 such as that shown in FIGS. 7A, 7B, and 7C that reports the link debug communication data for the entire PAN 200.

Referring now to FIGS. 7A, 7B, and 7C, it can be seen that there are six devices reporting communication link debug data. The six nodes have the following network identities (as shown in the "ID" column): 12, 13, 14, 20, 21, 60, and 61, and have been given, respectfully, node addresses (as shown in the "NODE" column), D47F(H), 447E(H), 6C80(H), A957(H), F53C(H), and 10A7(H) (wherein "(H)" denotes a hexadecimal number). For each network device (i.e., for each row), there are twenty three fields. The fields and expected range of values are shown and defined below.

The first column, for FIGS. 7A, 7B, and 7C (so that the values of the fields can be more readily related to the node to which they pertain), pertains to the identification (ID) field. The ID field is the network identification of the network device responding to the communication link debug data command. The second column is the Node field. The Node field is the short address of the node. Using a Node field assists in identifying devices if there are duplicate ID's in the network. Due to screen width and formatting difficulty, it would not be practical to report a transmitter subscriber ID (TSID; according to further aspects of the embodiments, the TSID is the Crestron touch-settable ID or product serial number of the device) or effective user ID (EUID). The Node field value will always be unique within the particular network. As those of skill in the art can appreciate, the EUID is also known as the IEEE EUI-64.

The stack derived Zigbee LQI value (ZLQI) is an LQI based on error rates in decoding received signals. Because of limitations in how certain standards' bodies require this value to be derived, it has been shown to offer limited value in debugging practical systems. According to aspects of the embodiments, fields 16-23 are used to generate the ALQI value of field 3, which offers a better tool for debugging the communication links of PAN 200. The values reported in field 8-15 can be used for informational purposes, or to capture long term trends in operation, so that installers or other users/operators of PAN 200 can verify overall system operation at later times, over longer periods of time. The values of fields 8-15, the reported ALQI value of field 3, and the ZLQI value can all be compared and various weights applied, over various and predetermined periods of time in order to discern the overall status of PAN 200 according to further aspects of the embodiments.

Use of ALQI, as described in greater detail below, provides an indicator of a certain link "health." ALQI provides either or both of a pass/fail evaluation of the status of a link, as well as a relative indicator of the link health (such as, but not limited to, "green" (all okay), "yellow" (some, but not overwhelming problems), and "red" (there are significant issues that need to be addressed as soon as practically possible). ALQI provides a substantially quicker overview of the status of a link than can be ascertained from evaluating each of the status indicators.

Field 5 reports the cost field (COST). The cost value is a stack-derived parameter indicating the difficulty in delivering messages to the destination (in this case, from the network device to gateway device 202). The values of the COST field cover a range of {0,7}, with {0} being preferable. The COST field value totalizes the probability of delivery failure along each node in the path to the destination. On solid networks, it is not unusual to see a COST value of {0} with multiple hops. COST values over {2} generally indicate sustained communication problems, which will likely show up in other parameters in the listing.

Field number 6 reports the TBMT field, or the average time between map-to-one route requests received (MTORR RXs) in seconds. The TBMT field reports the average number of seconds between receiving MTORR messages. In normal, stable networks, this value can be set to be between about 179 to about 180 seconds; however, other ranges of values of time are possible to use. As those of skill in the art can appreciate, the setting of the average number of seconds for the TBMT field is a balance between bandwidth consumption and route-healing responsiveness. As known to those of skill in the art, even with normal, expected jitter, the measurement of TBMT should be about 180 seconds, or three minutes. Values below this indicate application support sublayer (APS) failures from nodes in the system, as additional MTORRs are used to heal routes when messages fail. Very low values (below 60 seconds) are considered to be a significant problem, as the network is consuming considerable bandwidth trying to reform routes.

Filed number 7 reports the received signal strength indication (RSSI) field. The RSSI field provides the average last-hop RSSI value for the network device. Because network devices only talk to the next network device in the route, the RSSI information is only relevant with regard to the link between a first network device and a second one that the first can communicate with, notwithstanding that the first device can hear several other network devices in the network. The RSSI field value is a moving average and network devices that do not communicate very often (such as battery keypads) can take some time to build up a sensible number in this field.

In regard to fields 8-15, described below, the values are determined or kept track of since that time in which a re-boot has occurred. That is, beginning upon start up, or a re-start, the number of occurrences of the events are kept track of, and reported as shown in FIG. 7B.

Field number 8 reports the MAC layer transmit failure rate (MACFR). The MACFR number indicates the percentage of MAC transmission attempts that fail. The device's transport layer is not informed about why a MAC transmission event fails; the causes can include "unable to find clear airspace (busy)" or "the destination does not acknowledge the message." The latter can be the result of interference or too great of a range (e.g., weak signal) between network devices.

Field 9 reports the MAC layer transmit retry rate (MACRR). MACRR indicates the percentage of MAC transmission attempts that are retries. A relatively high MACRR rate is a clear indication that a network device has trouble communicating with its next hop, although other non-application data can contribute to this value (e.g., neighbor table exchanges and other network management operations, among others).

Field 10 reports the APS layer transmit failure rate (APSFR). APSFR is the percentage of APS messages (application messages) that fail to be delivered to gateway device 202. The APSFR provides a level of confidence that a message will be delivered. APSFR indicates that a message got all the way from one network device's application to the destination's application (in this case, gateway device 202). As those of skill in the art can appreciate, the significance of "application-to-application" means the format provides confirmation that the message went all the way from the application task that sent it, to the other devices' application task receiving it. This is significant because just getting the other device's MAC layer acknowledge does not prove the device received it.

If there are buffering shortages in that device, the message may get lost when it is handed up through the communication layers, and this will happen after it has already sent out the MAC layer acknowledge. APS messages provide two retries in an attempt to obtain a satisfactory transmission (two retries means three attempts—the first attempt, then two retries). Each APS transmission attempt can trigger many MAC transactions. Due to the robust communication structure with three levels of retry for messaging, it is a fairly serious issue to have a sustained, measurable APS failure rate. Very low bandwidth devices (like battery keypads) that encounter a sporadic failure can result in this effect lingering in its APSFR for some time, but more active/router devices should maintain a value of almost zero in normal conditions.

Field 11 reports the APS layer retry rate (APSRR). The APSRR is the percentage of APS send events that are retries for an existing message. Retries at the APS layer are not uncommon even in stable networks, but this should be viewed with caution. Sustained APS retries rates indicate the MAC layer is regularly having trouble sending messages.

Field 12 reports the amount of corrupt received messages (RXCORR). RXCORR is based on counts of messages that were received by the network device, but are unable to be decoded properly because of bit errors. A RXCORR is generally the result of local interference corrupting the received signal, or a very weak received signal. RXCORR is derived with specific criteria to generate a percentage for convenience in analysis. It does not literally correlate to how many received messages are corrupted. Such criteria cannot be implemented as messages with greater levels of corruption will not be detected by the lower layers anyway.

Field 13 reports the medium busy rate (BUSY). BUSY is the approximate percentage of time that the airspace around a network device is considered "busy" and therefore the device cannot talk. Clear-channel assessment is performed on the network device prior to sending a message in order to increase the likelihood that the destination network device will hear it, as well as for medium sharing purposes. As those of skill in the art can appreciate, BUSY can represent a combination of energy detection (e.g., making sure there is no interference), as well as a determination of frame detection in regard to the IEEE 802.15.4 standards, although other uses of BUSY exist as well, as known to those of skill in the art. That is, the medium is busy for energy, or if any other IEEE 802.15.4 network device is talking (regardless of how weak the signal is for the IEEE 802.15.4 network device). This can be important to consider when partitioning networks in dense settings. Having a significant amount of IEEE 802.15.4/ZigBee networks on a channel can make it very busy, even if the networks are distant and weak. A preliminary assessment can be made by using network devices that support the "scan" console command, and looking for channels that have both low energy and little/no detected networks.

Field 14 reports the amount of turnover in the network device's neighbor table (NTRNVR). Neighbor (i.e., neighboring network devices) status and link quality are used in route determination as well as the propagation of broadcast messages and other network maintenance functions. When the content of a network device's neighbor table is changing often, it is an indication that it has a lot of trouble communicating with its neighbors, they are moving in and out of range, or they are going on- and off-line. Regardless, a high NTRNVR increases the likelihood that the network device's send messages can fail, as it cannot count on the neighbors around it being there when it tries to send data. Like the received message corruption field, this parameter is based on a specific change rate and translated to a percentage for relative comparisons, and does not correlate directly to any easily measurable quantity.

Field 15 reports an indication of buffer exhaustion on a network device (BFEXH). BFEXH indicates that a network device cannot allocate memory for stack operations. Generally this is the result of a routing network device being inundated with too much data, before it can retransmit it and free buffering space. This condition is often the result of MAC send difficulties, such as interference or busy state. When a routing network device loses its buffering ability, it will cause messages to fail for network devices that route through it. Very often a network device that has buffer exhaustion issues will be in the routing path of another network device that shows APS retry/failure rates. As in some of the other metrics, this is a derived value for specific reference criteria, and expressed as percentage for convenience for comparing to other data. Buffer exhaustion is an important qualifier of Node performance and routing ability According to aspects of the embodiment, the ALQI field is a high-level application value derived from certain ones of the link debug data. The ALQI field is an 8 bit hex number with higher values indicating better quality communications. Because the ALQI value aggregates several sources of data over a shorter period of time, it is more effective at showing problems more quickly than the existing ZigBee LQI (ZLQI) number in use currently (described below).

According to further aspects of the embodiments, ALQI provides a quick, but substantially accurate indicator of communication link status that can be used for troubleshooting systems; the other fields (fields 5-15) provide more detail on the source of problems, albeit on a slower pace. The ALQI field can be updated by the network device on every message it sends; consequently, the ALQI field is therefore generated more quickly than the ZLQI field. According to further aspects of the embodiments, more range (weight) is put on fields whose problems have historically generated more usability complaints. Other factors are maintained (albeit with lesser weight) because they can be indicative of marginal problems that would not always generate a complaint, but which can affect user experience negatively. Installers need the ability to see the effect of changes they are making in their system configuration. In addition, if there are intermittent problems, the user needs to be able to see that the problem is present, or not present, with some reasonable responsiveness. The use of some or all of the diagnostic data may eventually become part of user interfaces such as Pyng according to further aspects of the embodiments.

According to further aspects of the embodiments, each network device of network 200 can report the ALQI for communications to and from that node; this is accomplished by summing the values of the last eight data fields (which have been numbered as fields 16-23), and subtracting the same from 255, as shown in Equation 1 below: a high value ALQI indicates a high quality communication link to and from that particular network device.

$$ALQI = 255 - \min[\Sigma ALQIP, 255] \qquad (1).$$

According to aspects of the embodiments, the ALQI value is derived by summing the values of the designated ALQIP fields (fields 16-23), and subtracting the minimum of that summation and 255 from 255. A high value of ALQI means a better communication link in regard to that network device. When summed, the worst case values of the ALQIP fields can total more than 255 (their sum can be as high as 288): the ALQIP fields, described in greater detail below, are APF (with a value range from {0-64}), CCA (with a value range from {0-48}), APR (with a value range from {0-64}), MCF (with a value range from {0-32}), MCR (with a value range from {0-32}), RXC (with a value range from {0-16}), NTT (with a value range from {0-16}), and MTT (with a value range from {0-16}). Allowing the penalty sum to exceed 255 is done primarily to simplify the calculations involved when emphasizing certain fields over others. That is, if all field values were given equal weight, and could not sum greater than 255, the integer division needed to accurately produce fractional scaling becomes "messy." At small ranges, division truncation would also cause small penalty values to get lost. Still further according to aspects of the embodiments, creating the calculation as shown and embodied in Equation 1 ensures that the granularity at small penalty values is maintained while still allowing larger spans to be available to illustrate bad problems. In the unlikely event that the sum of the values exceeds 255, a zero ALQI is reported.

As described in detail above, fields 16-23 are the fields that are used to generate the ALQI value that is reported in field 3. Fields 16-23 are similar to, or based on, fields 10, 13, 11, 8, 9, 12, 14, and 6, respectively (16≈10; 17≈13; 18≈11; 19≈8; 20≈9; 21≈12; 22≈14; 23≈6) albeit with certain different definitions as to each of their derived values, e.g., cumulative versus shorter time intervals. According to further aspects of the embodiments, while fields 16-22 are or can be calculated or determined over one minute periods, if the nature of the node is such that it is asleep, it will not awake just to report an ALQI value; instead, it will awaken, and then after about the first minute, and every minute while awake, will calculate its respective value.

Field 16 is defined as the APF field, and is based on field 10, the APS failure rate (APSFR). As described above, APSFR is the percentage of APS messages (application messages) that fail to be delivered to gateway device 202. The APSFR provides a level of confidence that a message will be delivered. In field 16, however, which comprises an 8 bit signed data field, the APF value is calculated about every minute based on the last minute of APF failures, according to an aspect of the embodiments, instead over a total runtime. The difference is that in the former, the APF value exhibits greater volatility as it will change faster; over time, the APSFR value is time averaged over longer and longer periods of time, and so fluctuates much slower. APF is assigned a range of values from {0-64}.

Field 17 is defined as the CCA field, and is based on field 13, the BUSY field. As described above, BUSY is the approximate percentage of time that the airspace around a network device is considered "busy" and therefore the device cannot talk. For the CCA field, the CSMA block history average is saturated (i.e., limited to a maximum value of) every minute to a 40% maximum, then scaled to a maximum of 48. Carrier sense multiple access (CSMA) is a probabilistic media access control (MAC) protocol in which a node verifies the absence of the traffic before transmitting on a shared transmission medium, such as an electrical bus, or a band of the electromagnetic spectrum. Carrier sense means that a transmitter uses feedback from a receiver to determine whether another transmission is in progress before initiating a transmission. That is, it tries to detect the presence of a carrier wave from another station before attempting to transmit. If a carrier is sensed, the station waits for the transmission in progress to finish before initiating its own transmission. In other words, CSMA is based on the principle "sense before transmit" or "listen before talk". According to aspects of the embodiments, CCA is calculated over a one minute runtime, and is assigned a range of values from {0-48}, and is based on the last minute of the BUSY rate. According to further aspects of the embodiments, IEEE 802.15.4 PHY provides the following capability to perform CCA according to at least one of the following three methods. CCA Mode 1 defines an energy level above a predetermined threshold. The CCA can report a busy medium upon detecting any energy above the ED threshold. In CCA Mode 2, there is a carrier sense only. The CCA can report a busy medium only upon the detection of a signal with the modulation and spreading characteristics of IEEE 802.15.4. This signal can be above or below the ED threshold. In CCA Mode 3, which is a carrier sense with energy above threshold, the CCA can report a busy medium only upon the detection of a signal with the ED threshold.

Use of field 17 in determining ALQI has advantages according to aspects of the embodiments. If it is seen that node "A" has a high "BUSY" rate, it is having trouble transmitting because of energy/traffic in its vicinity. If device "B" is using "A" in its path, and "B" has a high APS (end-to-end) transmit failure rate, it could be the result of the conditions at device "A" (i.e. "A" is unable to pass messages along due to its local energy problems). This can be a significant troubleshooting aid, because normally all that can be ascertained is that device "B" has messages failing, and so it would otherwise appear the problem is at "B".

Field 18 is the APR field, and is based on field 11, which reports the APS layer retry rate (APSRR). The APSRR is the percentage of APS send events that are retries for an existing message. In field 18 the APR value is calculated over a one minute block according to an aspect of the embodiments, instead of total runtime, and scaled to a value of {0-64}. The APR value is based on the last minute of APS retries.

Field 19 is the MCF field, and is based on field 8, which is the MAC failure rate (MACFR) field. The MACFR field indicates the percentage of MAC transmission attempts that fail. In field 19, the value is calculated over a one minute block instead of over the total runtime according to an aspect of the embodiments. MCF is assigned a value between {0-32}. According to a further aspect of the embodiments, MCF is based on the last minute of MAC failures.

Field 20 is the MCR field, and is based on field 9, which is the MAC retry rate field (MACRR). MACRR indicates the percentage of MAC transmission attempts that are retries. The MCR field in field 19 calculates the MAC retry rate over a one minute block instead of over the total runtime, according to an aspect of the embodiments. The MCR field is assigned a value between 0 and 32. According to a further aspect of the embodiments, MCR is based on the last minute of MAC retries.

Field 21 is the RXC field, and is based on field 12, which is the RXCORR field. RXCORR is based on counts of messages that were received by the network device, but are unable to be decoded properly because of bit errors. In field 21, RXC is calculated over a one minute block instead of the total runtime, according to an aspect of the embodiments.

The RXC field is assigned a value between 0 and 16. According to a further aspect of the embodiments, RXCF is based on the last minute of RX corruption events.

Field 22 is the NTT field, and is based on field 14, which is the network turnover (NTRNVR) field. NTRNVR reports the amount of turnover in the network device's neighbor table. In field 22, the NTT value is calculated over one minute blocks as opposed to the total runtime, according to an aspect of the embodiments. NTT is assigned a value between 0 and 16. According to a further aspect of the embodiments, NTT is based on the last minute of neighbor turnover events.

Field 23 is the MTT field, and is based on field 6, which is the TBMT field. TBMT is the average time between map-to-one route requests received (MTORR RXs) in seconds. That is, the TBMT field reports the average number of seconds between receiving MTORR messages. MTT is assigned a value between {0-16}. Under normal conditions, TBMT is assigned a maximum value of about {180}. Therefore, the MTT ALQI penalty expression is defined to be:

$$MTT_{ALQIP} = (180 - TBMT) \times 3/32 \quad (2)$$

According to Equation (2), the MTT ALQI penalty gets bigger as the TBMT value gets smaller, and scaled to 3/32 for a max of 16 (which is a form of truncated division). In other words, a TMBT of 180 produces an MTT penalty of 0, because this is the network condition that is desired according to aspects of the embodiments. MTT is returned as having a value of zero if no problems occur. Field 23 is slightly different from fields 16-22 in its determination in that it is based not on a strict or somewhat strict time sense, but is instead based on a number of events. That is, field 23, which reports the MTORR penalty, is based on the last four MTORR events. If less than four events have been reported, then the field's entry with respect to the ALQI summation is zero. If an unusually long period of time transpires since the last fourth event, then the input from this field again is simply maintained on the last four events. If more than four events have occurred since the last reset, the most recent four are used to calculate Fields 16-23 are used to report the distribution of ALQI penalties for a network device, or node. As described above, the ALQI system, according to aspects of the embodiments, assigns a range and weighting criteria to each of the indicated problems (i.e., the subject matter of each of the fields). The ALQI starts at 255 (FF(H)) for no issues, and penalties are assessed based on the magnitude of each issue indicated. The penalties are summed and subtracted from 255. According to aspects of the embodiments, fields 16-23 as defined above provide an easier indication of communication problems within network 100.

According to aspects of the embodiments, each of fields 16-23 have been assigned ranges of values of {0-16}, {0-48}, or {0-64}. In all of these cases, the higher the value, the worse the communication issue addressed by the respective field. That is, for example, a value of {64} in field 16, the APF field (APS transmitter failure), means that a very high percentage of APS messages (application messages) fail to be delivered to gateway device 202. As described in regard to Equation (1), the sum of the values of field 16-23 comprise the value of ALQIP; to determine the value of ALQI, the minimum of 255 or ALQIP is subtracted from 255; values of ALQI that approach zero indicate communication link problems between and among network devices of PAN 200. A relatively higher ALQI value, one that approaches 255, indicates a better state of communication links between and among network devices of PAN 200. According to aspects of the embodiments, a value of ALQI of about 240 and above indicates a robust PAN 200 in terms of communications between and among network devices of PAN 200; a value of ALQI of about 200 and below indicates a problem in terms of communications between and among network nodes of PAN 200. However, as those of skill in the art can appreciate, these ALQI numbers are examples only, provided for the purposes of illustration only, and should not be taken in a limiting manner. According to further aspects of the embodiments, different values of ALQI can be ascertained to represent good and bad communications between and among network devices of PAN 200, based on different types of devices, their robustness in terms of communications, and other factors.

According to further aspects of the embodiments, two or more of fields 16-23 are interrelated; that is, a poor performance in one field-factor will show up as poor performance in a related field. This means that groups of communication issues are related to each other; if a first member of the groups indicates a good communication interface (by a better number (i.e., closer to zero)), then the related member will also indicates a good communication interface. Similarly, if a first member of the group indicate a poor communication interface, then a second member of the group could also indicate a poor communication interface.

According to further aspects of the embodiments, the distinction between good communication values and poor communication values is not necessarily linear; that is, for example, a range of values that indicates good communication values for a certain field can range from {0-5} while the range of poor communication values for the certain field can range from {6-16}.

As an example of what could be done with such data, if we see node "A" has a high "busy" rate, it is having trouble transmitting because of energy/traffic in its vicinity. If device "B" is using "A" in its path, and "B" has a high APS (end-to-end) transmit failure rate, it could be the result of the conditions at device "A" (i.e. "A" is unable to pass messages along due to its local energy problems). This can be a significant troubleshooting aid, because normally all we know is device "B" has messages failing, and so it would otherwise appear the problem is at "B".

FIG. 8 illustrates a flowchart of method 800 for diagnosing communication links in personal area network according to aspects of the embodiments. Method 800 begins with method step 802, in which a network node of PAN 200, such as, but not limited to, one or more of network devices 204, 206, 208, 210, 251, 252, 254, 256, 258, 260, 262, 264, and 266, substantially continuously monitors a first subset of communications link data between itself and other network nodes, as well as between itself and gateway device 202, based on a first time period. According to aspects of the embodiments, the first time period can be about a minute. According to further aspects of the embodiments, the first time period can be other time limits, such as less than a minute, several minutes, among other time periods. As described above, the first subset of communications link data can include communication link data such as that shown and described in fields 16-22 of FIGS. 7A-7C.

In method step 804, according to a first predefined time interval, one or more of the network nodes generates an ALQI value according to Equation (1) as described in greater detail above. According to aspects of the embodiments, the first predefined time interval can be about a minute (or about 60 seconds), but can be different time intervals as well, and can further be variable between two or more time intervals. The network node generated ALQI value is reported, along with the values of the variables that make up ALQIP as defined herein, as well as the values for the variables that make up ZLQI (and the most recent ZLQI value) are reported to gateway device 202. According to aspects of the embodiments, ZLQI is constantly updated, but on a time-average basis for the entire run time of each network node. As those of skill in the art can appreciate, ZLQI is updated by the stack layer on any incoming message; ZLQI is maintained for each device (node) in PAN 200 in the neighbor table, but is only reported for the node being used in the routing.

In method step 806, gateway device 202 receives the ALQI and evaluates it, and takes corrective actions if necessary. According to aspects of the embodiments, gateway device 202 can change channels, and/or provide suggestions in regard to corrective actions (e.g., increasing transmission power, receiver sensitivity, among other types). As those of skill in the art can appreciate, the nodes of PAN 200 can all be operating perfectly correctly and normally, and yet PAN 200 can still be experiencing communications difficulties due to external influences, such as electrical interference caused by machinery, or other sources (i.e., environmental sources).

In method step 808 one or more of the network nodes substantially continuously monitors a second subset of communications link data between itself and other network nodes, as well as between itself and gateway device 202. In method step 810, one or more of the network nodes generates a modified ALQI (second ALQI) when a predetermined number of occurrences of the second subset of communications link data occurs. According to an aspect of the embodiments, such predetermined number of occurrences can be four occurrences of the data embodied as field 23 of FIG. 23. That is, according to an aspect of the embodiments, the second subset of communications link data includes that of field 23 of the data packet reported to gateway device 202 by each of the one or more network nodes of PAN 200.

In method step 812, gateway device 202 receives the modified ALQI and evaluates it, and takes corrective actions if necessary. According to aspects of the embodiments, gateway device 202 can change channels, and/or provide suggestions in regard to corrective actions (e.g., increasing transmission power, receiver sensitivity, among other types). As those of skill in the art can appreciate, the nodes of PAN 200 can all be operating perfectly correctly and normally, and yet PAN 200 can still be experiencing communications difficulties due to external influences, such as electrical interference caused by machinery, or other sources (i.e., environmental sources).

In method step 814, according to a second predefined time interval, each of the one or more network nodes evaluates ZLQI as defined above, and reports the same to gateway device 202. As described above, the ZLQI values are based on a substantially continuous time averaged value of the variable over the entire running period of each network node (device). According to further aspects of the embodiments, the reporting of ZLQI can be done without consideration to any predefined time period, e.g., the values are updated at the network node whenever new variables values are received (represented by fields 5-15) and a report is made to gateway device 202. In method step 816, gateway device 202 stores and evaluates the reported ZLQI and takes corrective action if possible/necessary.

INDUSTRIAL APPLICABILITY

To solve the aforementioned problems, aspects of the embodiments are directed towards a unique system in which a wireless network reports a series of metrics to be employed for diagnosing communications links between the devices of the wireless networks, such as PAN 200.

The invention claimed is:

1. A method for determining an operational status of a wireless network system, comprising:
   monitoring a plurality of quality of service (QoS) communication indicators by a node of at least two or more nodes of the network system;
   generating a first application link quality indicator (ALQI) by the node based on a first subset of the plurality of QoS communication indicators according to a first time period;
   modifying the first ALQI with a second subset of the plurality of the plurality of QoS communication indicators only when a first predetermined threshold number of occurrences of the second subset of the plurality of QoS communication indicators has occurred without regard to the first time period to form a first modified ALQI; and
   performing a corrective action in regard to the wireless network system that includes at least one of changing channels, increasing transmission power, and increasing receiver sensitivity.

2. The method according to claim 1, further comprising:
   transmitting the modified ALQI by the first node to a second node in the network system.

3. The method according to claim 2, wherein
   the first node is any one of a plurality of network nodes that can include a fully functioning node, and a reduced functioning node, and further wherein,
   the second node is a gateway node, and further wherein the method further comprises:
   determining a corrective action by the gateway device based on the modified ALQI.

4. The method according to claim 3, wherein
   the corrective action can include one or causing the first node to change channels, increase transmission power, and increase receiver sensitivity.

5. The method according to claim 3, wherein
   the gateway node can communicate one or both of the received ALQI and modified ALQI to a diagnostic console connected via a wireless or wired connection to the gateway node.

6. The method according to claim 1, wherein the step of generating the first ALQI comprises:
   evaluating the following expression—

ALQI=255−min[ΣALQIP, 255], wherein ALQIP comprises the first subset of the plurality of QoS communication indicators.

7. The method according to claim 1, wherein the step of generating the modified ALQI comprises:

evaluating the following expression—

ALQI=255−min[ΣALQIP, 255], wherein ALQIP comprises the first and second subset of the plurality of QoS communication indicators.

8. The method according to claim 7, wherein the number of occurrences of the second subset of the plurality of QoS communication indicators is four.

9. The method according to claim 8, wherein
the first subset of QoS communication indicators comprises fields 16-22 of a link debug data reporting packet that is generated and transmitted by the first node to the second node, and
the second subset of QoS communication indicators comprise field 23 of the link debug data reporting packet.

10. The method according to claim 9, wherein
field 16 of the link debug data reporting packet is defined as an APF field, and is based on an APS failure rate (APSFR), and is assigned a range of values from 0 to 64, and wherein APSFR is defined as the percent of application messages that fail to be delivered from the first node to the second node;
field 17 of the link debug data reporting packet is defined as an CCA field, and is based on a BUSY rate, and is assigned a range of values from 0 to 48, and wherein the BUSY rate is an approximate percentage of time that airspace around the first node is considered "busy" and therefore unable to communicate;
field 18 of the link debug data reporting packet is defined as an APR field, and is based on an APS layer retry rate (APSRR), and is assigned a range of values from 0-64, and wherein APSRR is the percentage of APS send events that are retries for an existing message;
field 19 of the link debug data reporting packet is defined as an MCF field, and is based on a MAC failure rate (MACFR), and is assigned a range of values from 0 to 32, and wherein MACFR is the percentage of MAC transmission attempts that fail;
field 20 of the link debug data reporting packet is defined as an MCR field, and is based on a MAC retry rate (MACRR), and is assigned a range of values from 0 to 32, and wherein MACRR is the percent of MAC transmission attempts that are retries;
field 21 of the link debug data reporting packet is defined as an RXC field, and is based on an amount of corrupt received messages (RXCORR), and is assigned a range of values from 0 to 16;
field 22 of the link debug data reporting packet is defined as an NTT field, and is based on a network turnover (NTRNVR), and is assigned a range of values from 0 to 16, and wherein NTRNVR is the amount of turnover in the first node's neighbor table; and
field 23 of the link debug data reporting packet is defined as an MTT field, and is based on time between map-to-one route requests (TBMT), and is assigned a range of values from 0 to 16, and wherein the TBMT is an average number of seconds between receiving map-to-one requests received.

11. The method according to claim 10, wherein
the MTT can be calculated according to the following expression—

$MTT_{ALQIP}=(180-TBMT)\times 3/32$ wherein,
MTT is not reported unless a number of occurrences of TBMT is greater than or equal to four, and further wherein
MTT is determined based on the last four occurrences of TBMT, regardless of the number of TBMT occurrences.

12. The method according to claim 1, wherein the first time period is about one minute.

13. The method according to claim 2, further comprising:
generating a zigbee link quality indicator (ZLQI) based on a third subset of the plurality of the plurality of QoS communication indicators.

14. The method according to claim 13, wherein
the third subset of QoS communication indicators comprises fields 5-15 of a link debug data reporting packet that is generated and transmitted by the first node to the second node, and wherein
ZLQI is maintained over a runtime of the first node.

* * * * *